(12) United States Patent
Momona

(10) Patent No.: US 6,212,196 B1
(45) Date of Patent: Apr. 3, 2001

(54) MULTIPLE ACCESS COMMUNICATION SYSTEM AND METHOD FOR MULTIPLE ACCESS COMMUNICATION

(75) Inventor: Morihisa Momona, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/980,138

(22) Filed: Nov. 26, 1997

Related U.S. Application Data

(63) Continuation of application No. 08/606,079, filed on Feb. 23, 1996, now abandoned.

(30) Foreign Application Priority Data

Feb. 24, 1995 (JP) .................................................. 7-036635

(51) Int. Cl.[7] .................................................. H04J 3/02
(52) U.S. Cl. .......................... 370/449; 370/346; 370/347; 370/444; 370/455
(58) Field of Search .................................. 370/321, 431, 370/437, 442, 443, 444, 447, 449, 455, 458, 461, 346, 347, 348, 438, 439

(56) References Cited

U.S. PATENT DOCUMENTS

| | | | |
|---|---|---|---|
| 4,763,320 | * | 8/1988 | Rudolph et al. ........................ 370/85 |
| 4,787,081 | * | 11/1988 | Waters et al. ......................... 370/438 |
| 5,371,780 | * | 12/1994 | Amitay .................................... 379/58 |
| 5,491,694 | * | 2/1996 | Oliver et al. .......................... 370/85.4 |
| 5,515,379 | * | 5/1996 | Crisler et al. ......................... 370/95.3 |
| 5,546,392 | * | 8/1996 | Boal et al. ........................... 370/60.1 |
| 5,553,095 | * | 9/1996 | Engdahl et al. ....................... 375/222 |

OTHER PUBLICATIONS

T. Ohsawa, et al., "A New Access Control Scheme for Wide Mixed–Media PON System", pp. 1–6.

* cited by examiner

*Primary Examiner*—Douglas Olms
*Assistant Examiner*—Shick Hom
(74) *Attorney, Agent, or Firm*—Ostrolenk, Faber, Gerb & Soffen, LLP

(57) ABSTRACT

A master station sends polling signals to each slave station with respect to CBR data to which required constant bandwidth has been allocated. Next, the master station sends polling signals to each slave station with respect to VBR data with its average bandwidth kept constant. Finally the master station sends polling signals to ABR data to which residual bandwidth has been allocated. The bandwidth of a frame is allocated to a plurality of data from higher to lower priority order. Therefore excellent traffic characteristics can be obtained even when a plurality of data of different traffic characteristics are mixed in the system.

25 Claims, 17 Drawing Sheets

FIG.9

| ADDRESS 141 | AVERAGE AMOUNT OF CELLS 142 | ALLOCATED AMOUNT OF CELLS BEFORE 1 TIME 143 |
|---|---|---|
| SLAVE STATION 1 | | |
| SLAVE STATION 2 | | |
| .... | | |
| SLAVE STATION X | | |

FIG.10

| ADDRESS | AVERAGE AMOUNT OF CELLS | MAXIMUM AMOUNT OF CELLS | REQUIRED AMOUNT OF CELLS | ALLOCATED AMOUNT OF CELLS BEFORE 1 TIME | ALLOCATED AMOUNT OF CELLS BEFORE 2 TIMES | ......  | ALLOCATED AMOUNT OF CELLS BEFORE n-1 TIMES |
|---|---|---|---|---|---|---|---|
| SLAVE STATION 1 | | | | | | | |
| SLAVE STATION 2 | | | | | | | |
| ... | | | | | | | |
| SLAVE STATION X | | | | | | | |

| ADDRESS 161 | REQUIRED AMOUNT OF CELLS 162 | ALLOCATED AMOUNT OF CELLS BEFORE 1 TIME 163 |
|---|---|---|
| SLAVE STATION 1 | | |
| SLAVE STATION 2 | | |
| .... | | |
| SLAVE STATION X | | |

MULTIPLE ACCESS COMMUNICATION SYSTEM AND METHOD FOR MULTIPLE ACCESS COMMUNICATION

This is a continuation of application Ser. No. 08/606,079 filed on Feb. 23, 1996, now abandoned.

BACKGROUND OF THE INVENTION

This invention relates to a multiple access communication system between a master station and slave stations and, more particularly, to the one for processing various kinds of data of different traffic characteristics.

Recently interactive multi-media networks such as CATV have been adapting bi-directional communication allowing for data transmission between a master station and slave stations interactively. Generally the data transmission from the master station to the slave station has been conducted on a broadcasting channel by which the same data are transmitted to all the slave stations concurrently. While the data transmission from the slave station to the master station has been conducted on a multiple access channel by which data are time division multiplexed for transmission therebetween. In a certain system, the master station designates a slave station which is expected to transmit the data by a polling signal. Responding to the receipt of the polling signal, the designated slave station transmits the data to the multiple access channel.

In case 3 slave stations are expected to transmit data sequentially, the master station designates the slave station one after another and transmits a polling signal. The length of data which can be sent by each slave station is designated by the polling signal output from the master station. The slave station transmits bandwidth request information containing the designated data length and data length required to be sent responding to the receipt of the next polling signal. Based on the bandwidth request information from the slave station, the master station determines the data length which will be designated in the next polling signal.

The time interval for transmitting the polling signal to the slave station is equal to the data length which is expected to be transmitted from each slave station. This intends to multiplex the respective data on the same channel most efficiently without leaving any gap therebetween. Each slave station starts transmitting the data immediately upon receiving the polling signal. The master station transmits the next polling signal without waiting for the data from slave unit.

Recently packet communication has also been increasingly adapted. In this communication, transmission data are divided into units of packets transmittable in a predetermined size. Asynchronous Transfer Mode (hereinafter referred to as ATM) system is especially suitable for transmitting and receiving sound and video information requiring strict punctuality. In the ATM communication system, all the information uses cells to transmit various data of traffic characteristics. For example, Constant Bit Rate (CBR) data service requires transmission of a predetermined length of data at a given time interval. Another service is a Variable Bit Rate (VBR) data service which allows for variation in transmission data length but requires keeping the average length of data transferred to a predetermined value or more. Also Available Bit Rate (ABR) data service allows for transmission of any data length.

In the above-described conventional multiple access communication system, the interval for polling signal transmission by the master station is defined by the length of data expected to be transmitted from the slave station. The length of data sent from the slave station varies with the bandwidth request information from the slave station. Supposing that cyclic polling is conducted to 3 slave stations, each cycle for a round of polling varies with the amount of data sent from the slave station. So in this system, the CBR data requiring constant cycle and data length cannot be transmitted. Furthermore, the conventional multiple access communication system is not designed to retain average length of data sent from the respective slave stations. This indicates that the VBR data requiring a constant average length of the data cannot be used. The prior art system has difficulty in transmitting the ATM mode communication data with adequate traffic characteristics where CBR, VBR and ABR are mixed therein.

SUMMARY OF THE INVENTION

It is an object of the present invention to provide a multiple access communication system which allows the transmission data with excellent traffic characteristics even if CBR, VBR and ABR data are mixed therein.

The above object of the present invention is achieved by a multiple access communication system for communicating various types of data with a polling method between a master station and a plurality of slave stations, wherein the master station comprising:

means for setting a periodic frame;

a bandwidth allocation means for allocating a certain amount of bandwidth transmittable within a the frame to each of the slave stations in order of priorities that is determined based on data types; and an instruction means for transmitting an instruction to transmit data equivalent to a bandwidth allocated for each data by the bandwidth allocation means at every frame.

Furthermore, the above object of the present invention is achieved by a method for multiple access communication for communicating various types of data with a polling method between a master station and a plurality of slave stations, the method comprising steps of:

setting a periodic frame in the master station;

allocating a certain amount of bandwidth transmittable within a the frame to each of the slave stations in order of priorities that is determined based on data types in the master station;

transmitting an instruction to transmit a data equivalent to an allocated bandwidth to each slave station in the master station; and transmitting a data equivalent to a bandwidth instructed by the master station in the slave station.

In the above described invention, the bandwidth within a frame is allocated to data from higher to lower priority orders. So the bandwidth will be allocated first to the data having highest priority for bandwidth allocation. Even though data of different priorities are mixed in the system, excellent traffic characteristics are obtained.

In the the present invention, the bandwidth allocation means comprises a reception means for receiving information containing data length required for the next transmission in order of priorities from each of the slave stations and allocates the respective bandwidth to data in order of priorities based on received information of the required data length.

According to the present invention, the bandwidth allocation is set in order of high priority given to data based on desired bandwidth received from the slave stations. As a result, excessive bandwidth is not allocated to the data with higher priority. The rest of the data are also allocated with appropriate bandwidth.

In the present invention, various kinds of data is transmitted including CBR data in which required bandwidth in the cycle is constant, VBR data in which bandwidth variation in the cycle is allowed but average bandwidth has to be kept to a predetermined value or larger and ABR data in which any bandwidth is available. The data are allocated with the respective bandwidth sequentially in order of CBR, VBR, and ABR from higher to lower priorities.

The present invention is capable of transferring the CBR, VBR and ABR data sequentially in this priority order which are mixed in the ATM communication.

The bandwidth allocation means of the present invention allocates constant bandwidth to the CBR data. The VBR data is allocated a bandwidth equivalent to the minimum value selected from: 1) the bandwidth required for keeping the average bandwidth to the predetermined value or more 2) the allowable maximum bandwidth; and 3) the bandwidth required by the slave station. The ABR data is allocated a bandwidth equivalent to the minimum value selected from the remaining bandwidth available in the frame resulting from the subtraction of bandwidth allocated to the CBR and VBR from the bandwidth required by slave station.

The present invention transfers CBR, VBR and ABR data. The CBR data are allocated with a constant bandwidth. The VBR data are allocated with the smallest bandwidth selected from the bandwidth required for keeping constant average value, the allowable maximum bandwidth and the bandwidth required by the slave station. The ABR data are allocated with the smaller bandwidth selected from the reminder of the bandwidth and the bandwidth required by the slave station.

In the present invention, the plurality of slave stations transmit data equivalent to allocated bandwidth in response to transmission instruction. The instruction means outputs a polling signal to one of those slave stations to instruct data transmission, waits for a period equivalent to bandwidth allocated to the slave station and then transmits a polling signal to the next slave station to instruct data transmission.

In the above invention, the master station transmits a polling signal to the next slave station without waiting for the precedent slave station to complete its data transmission. By this method the data sent from slave stations can be multiplexed efficiently without leaving any gap.

BRIEF DESCRIPTION OF THE DRAWINGS

This and other objects, features and advantages of the present invention will become more apparent upon a reading of the following detailed description and drawings, in which:

FIG. 9 is a figure for explaining an example of the CBR polling table;

FIG. 10 is a figure for explaining an example of the VBR polling table;

FIG. 11 is a figure for explaining an example of the ABR polling table;

DESCRIPTION OF THE PREFERRED EMBODIMENTS

An embodiment of the present invention is described in detail.

Figure 1:
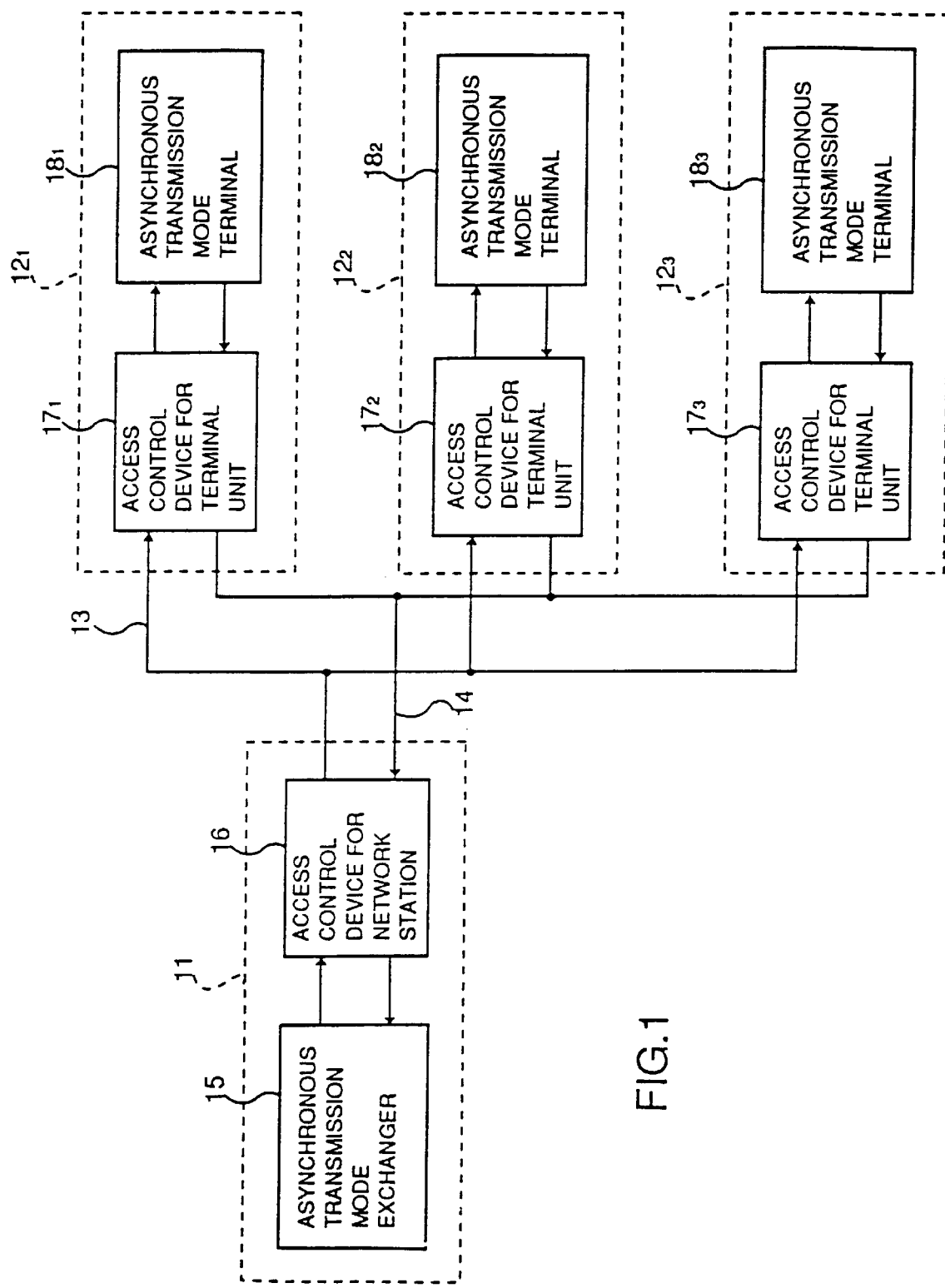
FIG. 1 is a block diagram of a circuit configuration of a multiple access communication system of an embodiment of the present invention.

FIG. 1 shows a construction of the multiple access communication system of an embodiment of the present invention. This communication system comprises a master station 11, first to third slave stations $12_1$ to $12_3$, a broadcasting channel 13 for transmitting data from the master station 11 to the slave station $12_1$ to $12_3$. The master station 11 comprises an ATM exchange office 15 for controlling destination of the cell in conjunction with network and master station access control unit 16 which controls data transmission to the broadcasting channel 13 and data reception from the multiple access channel 14. The first slave station $12_1$ comprises a slave station access control unit $17_1$ and an ATM terminal $18_1$. The second and the third slave stations $12_2$ and $12_3$ have the same constructions as the first slave station $12_1$.

Figure 2:
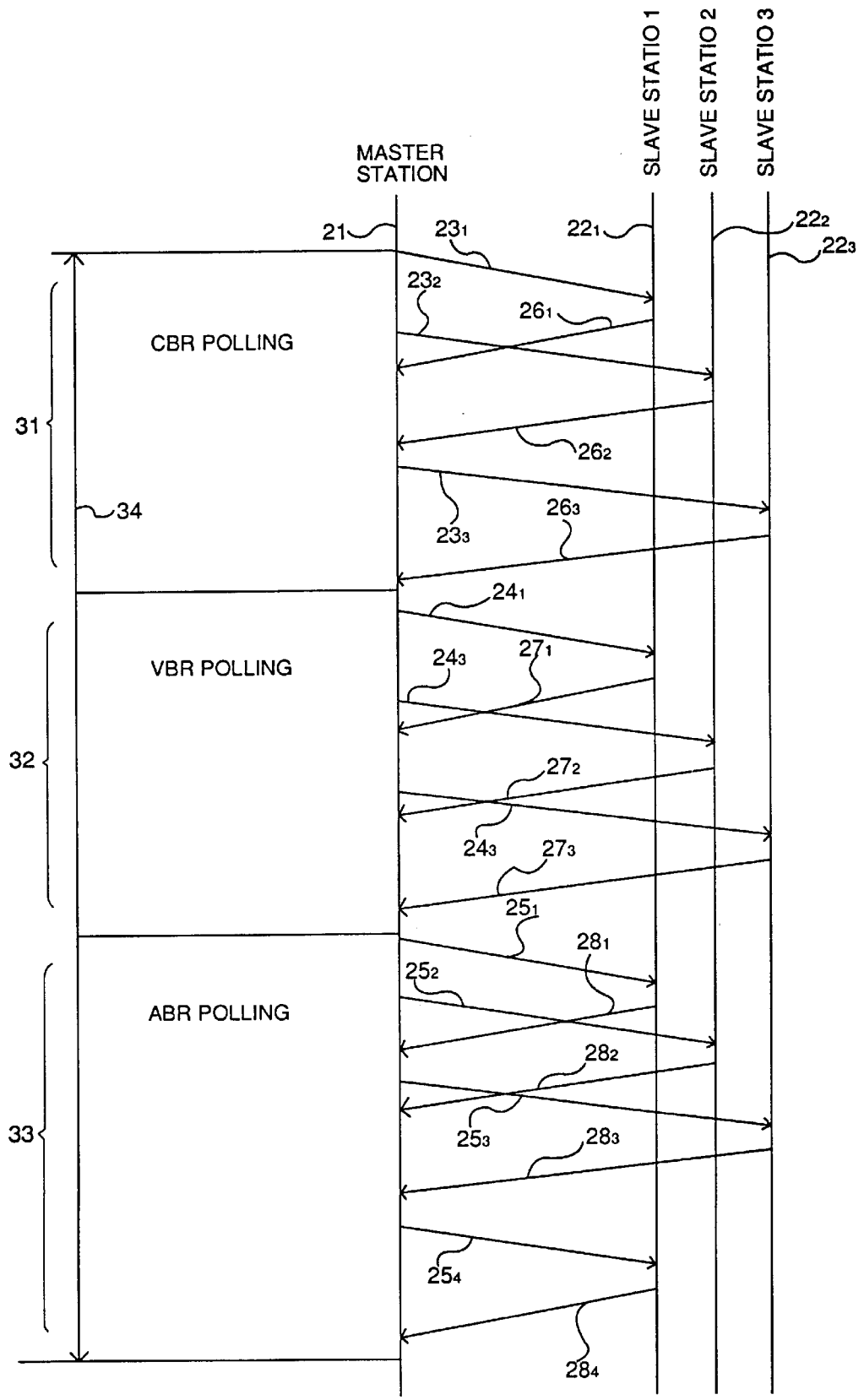
FIG. 2 is a figure for explaining a sequence of the signal flow on the channel in the multiple access communication system shown in FIG. 1.

FIG. 2 graphically shows the signal access sequence on the channel 13 and 14 in the multiple access communication system shown in FIG. 1. It is assumed that the time is expected to elapse by moving downward from the top of this sequence. Longitudinal lines 21 and $22_1$ to $22_3$ denote the master station and the first to the third slave stations, respectively. Rightward arrows $23_1$ to $23_3$, $24_1$ to $24_3$ and $25_1$ to $25_4$ from the master station 21 to each of slave stations $22_1$ to $22_3$ denote the flow of the polling signal, respectively on the broadcasting channel 13. While leftward arrows $26_1$ to $26_3$, $27_1$ to $27_3$ and $28_1$ to $28_4$ from the slave stations $22_1$ to $22_3$ to the master station 21 denote the flow of transmission data on the multiple access channel 14. Data transmission between the master station 21 and slave stations $22_1$ to $22_3$ is conducted in a periodic cycle. Within a round of the cycle, CBR data service 31, VBR data service 32 and ABR data service 33 are conducted, respectively. The total length of the above services 31 to 33 is set to a predetermined value, which is called as a frame 34.

The master station 21 transmits CBR polling signals $23_1$ to $23_3$ to slave stations $22_1$ to $22_3$ sequentially for polling the CBR data. The CBR polling signals $23_1$ to $23_3$ indicate the CBR data transmission to the respective slave stations and contain information representing data length which can be transmitted by each slave station. The data length is expressed in cell units. The transmission amount of cells is called as an allocated amount of cells. The allocated amount of cells for the CBR data is defined by each bandwidth of CBR data of the slave station, which has been obtained from the ATM exchange office 15. After transmitting the CBR polling signal $23_1$ to the first slave station $22_1$, the master station 21 waits for the period equivalent to the amount of cells allocated to the first slave station $22_1$. Then the master station 21 transmits the CBR polling signal $23_2$ to the second slave station $22_2$. After transmitting the CBR polling signal $23_2$ to the second slave station $22_2$, the master station 21 waits for an amount of cells allocated to the second slave station and then transmits the CBR polling signal $23_3$ to the third slave station $22_3$.

Receiving the CBR polling signal $23_1$, the first slave station 221 transmits a signal $26_1$ to the master station 21, which contains CBR data equivalent to the allocated amount of cells and the required amount of cells for the next transmission from slave station which will be a transmission of VBR data. Receiving the CBR polling signal $23_2$, the second slave station $23_2$ likewise transmits a signal $26_2$ to the master station 21. The third slave station $22_3$ transmits a signal $26_3$ in the same way.

The master station 21 transmits VBR polling signals 241 to 243 sequentially for polling VBR data. These signals contain information of the allocated amount of cells expressed in data length of the VBR data transmittable by the slave stations. The master station 21 determines the allocated amount of cells for VBR data based on average bandwidth provided from the ATM exchange office 15, the allowable maximum channel bandwidth and the amount of cells requested for VBR data received from each slave station. This will be explained later in more detail. The master station 21 transmits VBR polling signal $24_1$ to the first slave station $22_1$ in the same manner as for transmitting CBR polling signals. The master station 21 waits for the period equivalent to the allocated amount of cells and then transmits the next VBR polling signal $24_2$ to the second slave station $22_2$.

Receiving the VBR polling signal $24_1$, the first slave station $22_1$ transmits a signal $27_1$ to the master station which contains that station's VBR data equivalent to the allocated cell and the amount of cells required for the next transmission from slave station 2 which will be ABR data. The second slave station $22_2$ transmits a signal $27_2$ to the master station 21 upon receiving the VBR polling signal $24_2$. The third slave station $22_3$ also transmits a signal $27_3$ to the master station 21 upon receiving the VBR polling signal $24_3$.

Upon completion of the VBR polling, the master station 21 transmits ABR polling signals $25_1$ to $25_3$ sequentially for polling ABR data. The ABR polling signals contain information of the allocated amount of cells representing bandwidth of the ABR data transmittable by each slave station. The allocated amount of cells is determined by the master station based on the maximum bandwidth of ABR data for each slave station which has been obtained from the ATM exchange office 15 and the required amount of cells for the ABR data which has been received from each slave station. After transmitting the ABR polling signal to the slave station, the master station waits for a period equivalent to the allocated amount of cells, and then resumes transmitting the polling signal to the next slave station.

Receiving the ABR polling signals $25_1$ to $25_4$, slave stations to $22_1$ to $23_1$ transmit signals $28_1$ to $28_4$, each of which contains information of the ABR data equivalent to the allocated amount of cells and the required amount of cells for the next ABR data. If the amount of ABR from the first to the third slave stations $22_1$ to $22_3$ is less than the amount of cells left available in 1 frame, the master station 21 starts sequentially transmitting the ABR polling signals once again to the slave stations $21_1$ to $22_3$ sequentially. When the frame has been completed, the master station 21 terminates transmission of the ABR polling signal. If the polling on the current frame is finished at, for example, the second slave station, the ABR polling signal transmission in the next frame will start at the third slave station. Upon termination of one frame, the master station in the next frame again starts with transmission of the CBR polling signals.

Figure 3:
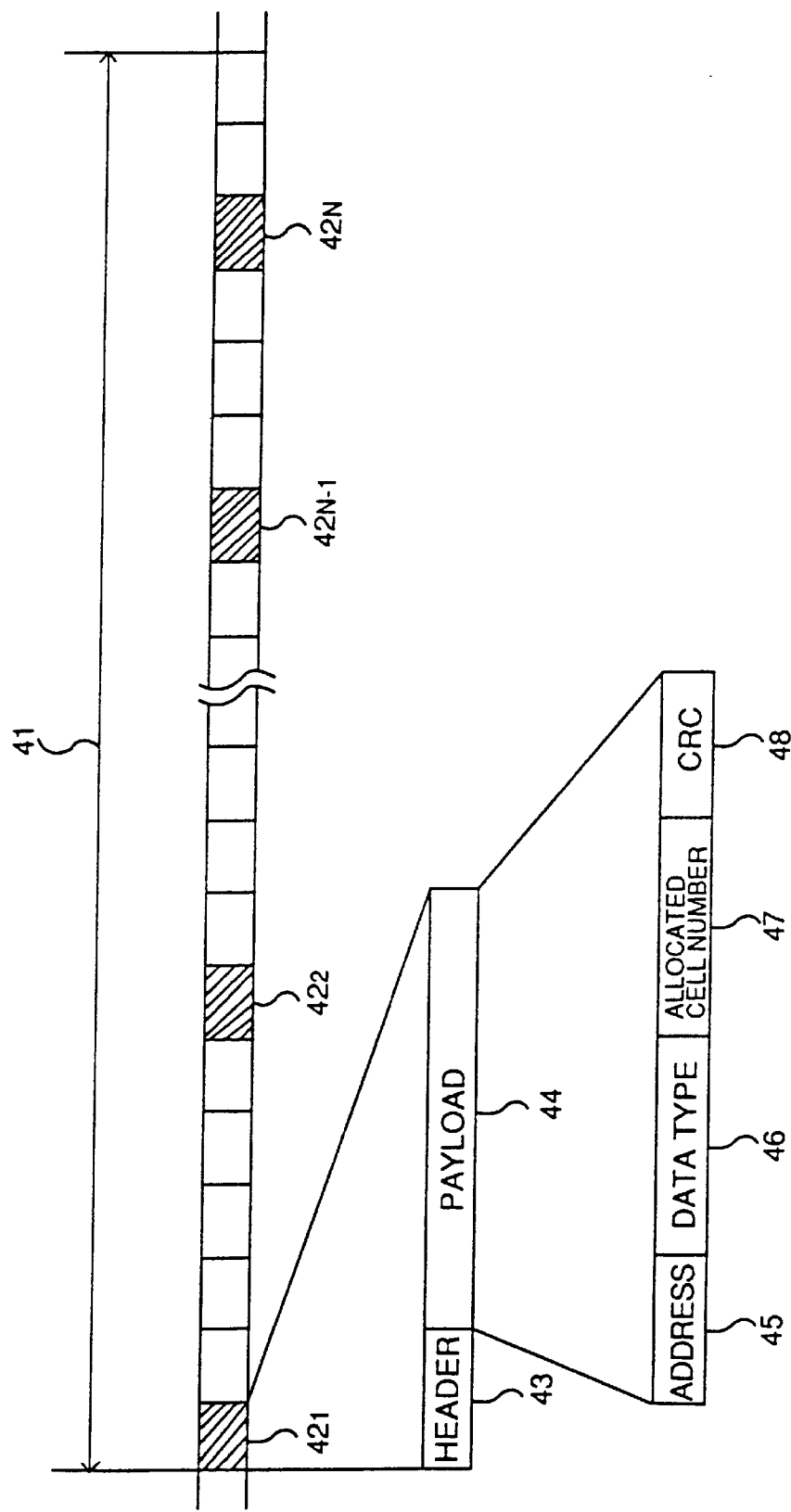
FIG. 3 is a figure for explaining a format of a signal transmitted to all slave stations from the master station on broadcasting channel.

FIG. 3 shows a signal format which is transmitted from the master station 11 to all of the slave stations $12_1$ to $12_3$ on the broadcasting channel 13. A frame 41 with fixed length is repeatedly transmitted from the master station to the slave station. A single frame contains 100 cells, for example. The shaded cells $42_1$ to $42_N$ (referred to as control information cells) transmit control information for polling. The other cells (referred to as data cells) are used for data transmission. The control information cells $41_1$ to $41_N$ are identical to the CBR polling signals $23_1$ to $23_3$, VBR polling signals $24_1$ to $24_3$ shown in FIG. 2 or ABR polling signals. The data cell is inserted between the control information cells. In the control information cell, a virtual pass identifier (VPI) which identifies a virtual pass in the network and a virtual channel identifier (VCI) which provides the number for identifying the virtual channel in the network have been set to predetermined eigenvalues, respectively. Based on these values, access control units of the central and slave stations distinguish the control information cell from other data cells. The control information cell is not transferred to the exchange office terminated within the access control unit or the terminal unit.

The control information cell is divided into a header 43 and a payload 44 for transmitting various types of information. The payload 44 is formed of address information 45 for designating the addressed slave station, data type 46 for allowing the addressed slave station to have transmission, allocated amount of cells 47 and an error detection code 48 for detecting bit errors therein. The data type 46 designates the data type from the CBR data, VBR data and ABR data. A cyclic redundancy check (CRC) is used as the error detection code 48.

Figure 4:
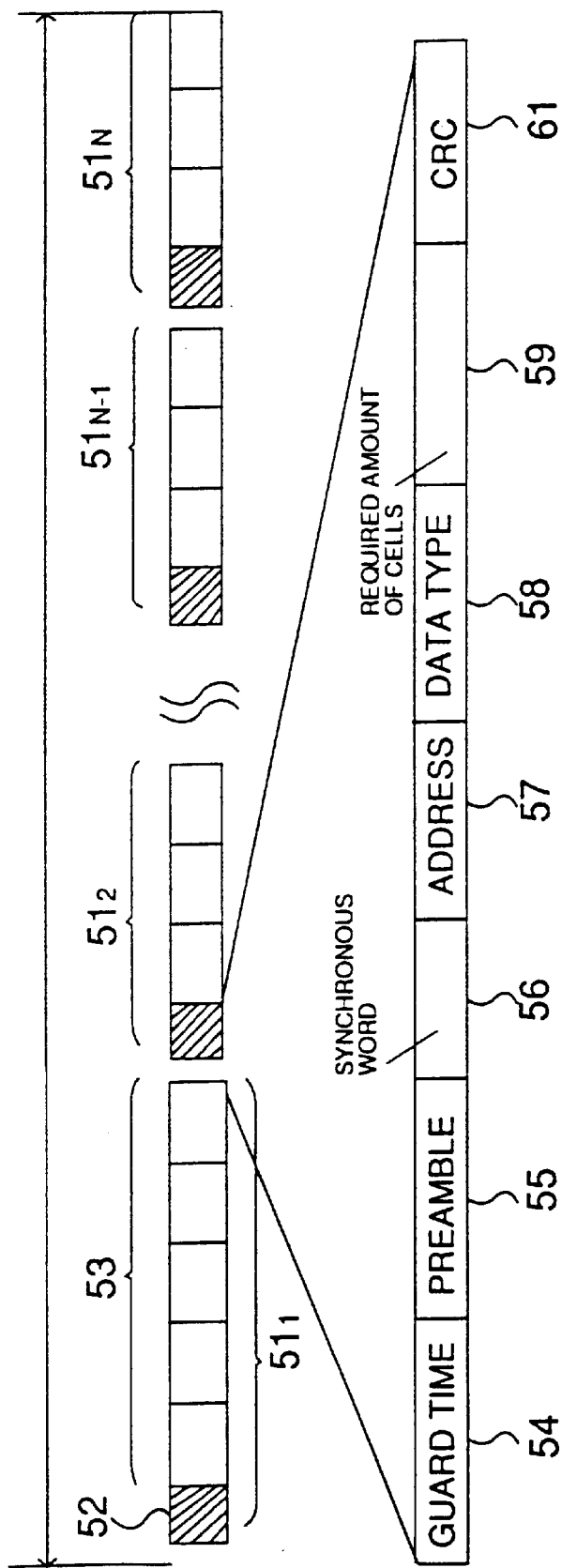
FIG. 4 is a figure for explaining a format of a signal transmitted from slave stations to the master station on multiple access channel.

FIG. 4 shows a format of the signal transmitted from a slave station to the master station on the multiple access channel 14. A frame with fixed length is repeatedly transmitted in the same way as aforementioned. In a single frame, burst signals $51_1$ to $51_N$ intermittently sent from the first to the third slave stations are time division multiplexed. The burst signal sent from each slave station is formed of the control information cell 52 and data cells 53. The control information cell 52 has the same size as the data cell which contains various information. A guard time 54 for preventing data collision is set between signals so that burst signals do not collide with each other. A preamble 55 is a signal for reproducing the clock. A sync. term 56 is a code for detecting a location of the burst signal. An address 57 is a code for identifying the slave station as the transmitter. A data type 58 represents the type of data being sent after the control information cell 52. A required amount of cells 59 is the information of the amount of cells required to be sent in the next transmission. The error detection code 61 is used for detecting bit error within the payload by using cyclic redundancy check.

Figure 5:
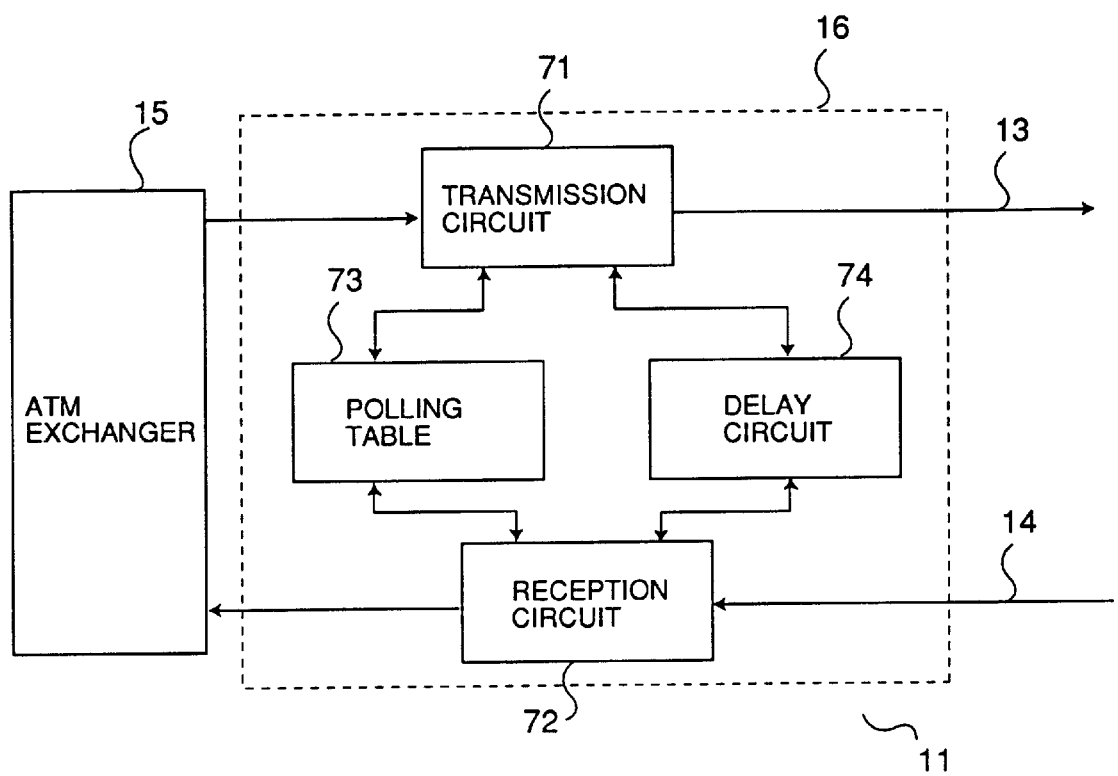
FIG. 5 is a schematic view for showing a construction of the master station in the multiple access communication system shown in FIG. 1.

FIG. 5 shows a schematic view of the construction of the master station 11 in the multiple access communication system shown in FIG. 1. The circuit parts which are the same to those of FIG. 1 have the same reference characters, thus the explanation of these elements is omitted. The master station 11 comprises the ATM exchange office 15 and the master station access control unit 16. The master station access control unit 16 comprises a transmission circuit 71 for transmitting a signal to the broadcasting channel 13, a reception circuit 72 for receiving a signal from the multiple access channel 13, a polling table 73 in which data for obtaining the allocated amount of cells are registered and a delay circuit 74 for delaying the timing either for transmitting or receiving the signal. Description of the construction and function of each circuit is explained below in detail.

Figure 6:
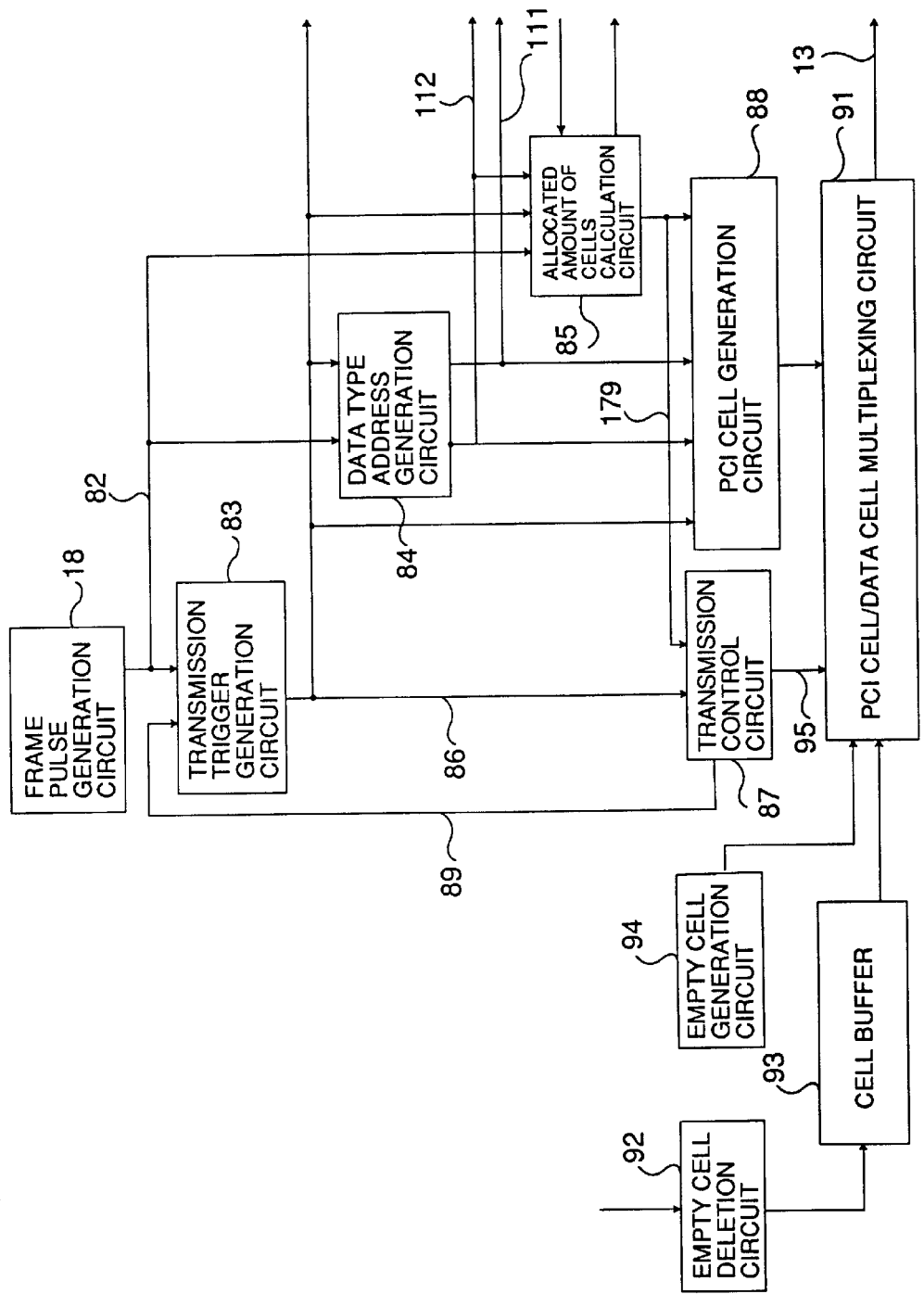
FIG. 6 is a block diagram of a construction of the transmission circuit shown in FIG. 5.

FIG. 6 shows the construction of the transmission circuit 71 shown in FIG. 5. A frame pulse generation circuit 81 generates a frame pulse 82 indicating the start of transmission at every frame. The frame pulse 82 is input to a transmission trigger generation circuit 83, a data type/address generation circuit 84 and the allocated amount of cells calculation circuit 85. The transmission trigger generation circuit 83 generates a transmission trigger signal 86 for starting polling signal transmission. The data type/address generation circuit 84 sets the data type and address of the control information shown in FIG. 3. The allocated cell calculation circuit 85 obtains the allocated amount of cells contained in the payload. The transmission trigger signal 86 is input to the data type/address generation circuit 84, the allocated amount of cells calculation circuit 85, transmission control circuit 87, and a PCI cell generation circuit 88. Transmission trigger signal 86 is also input to the polling table 73 and the delay circuit 74 illustrated in FIG. 5.

The transmission control circuit 87 counts the data amount of cells which should be transmitted after the control information cell. This circuit 87 is designed to transmit a data cell end signal 89 when it counts up to the allocated amount of cells. The PCI cell generation circuit 88 generates the control information cell shown in FIG. 3. A PCI cell/data cell multiplexing circuit 91 time-division multiplexes the control information cell and the data cell which is sent to the broadcasting channel 13. An empty cell erasing circuit 92 erases the empty cell contained in the signal received from the ATM exchange office 15. Effective cells are accumulated in a cell buffer 93. An empty cell generation circuit 94 generates a dummy cell if the cell buffer 93 is unoccupied.

Figure 7:
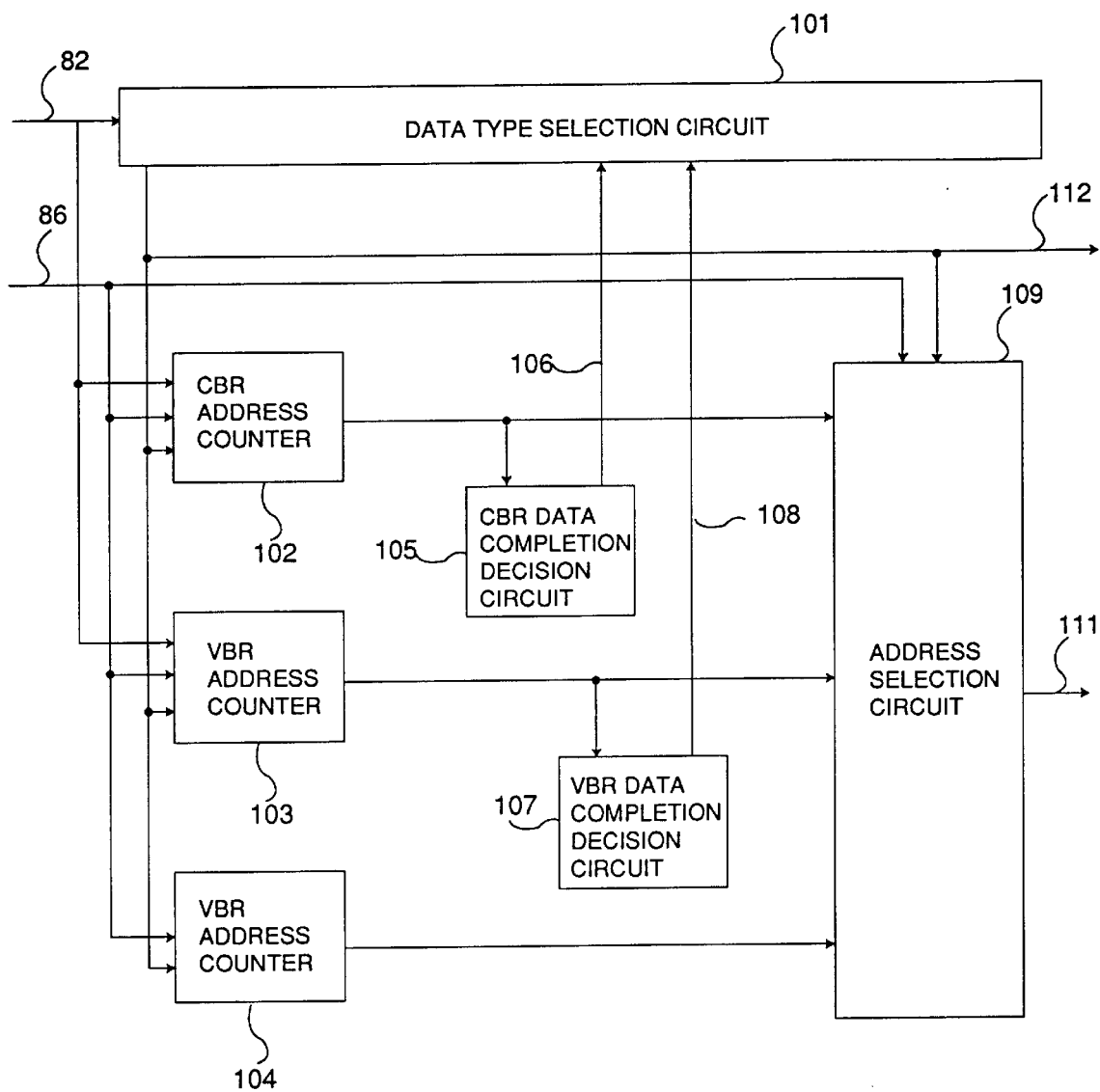
FIG. 7 is a block diagram of a construction of the data type/address generation circuit shown in FIG. 6.

FIG. 7 shows the construction of the data type/address generation circuit 84 shown in FIG. 6. This circuit 84 sets the data type and the slave station address of the control information. The frame pulse 82 output from the frame pulse generation circuit 81 shown in FIG. 6 is input to a data type selection circuit 101, CBR address counter 102 and VBR address counter 103. The CBR address counter 102 updates the address of the slave station to which the CBR polling signal is sent. The VBR address counter 103 changes the address of the slave station to which the VBR polling signal is sent. An ABR address counter 104 changes the address of the slave station to which the ABR polling signal is addressed. A CBR data end judgment circuit 105 outputs a CBR end signal 106 when the count value of the CBR address counter 102 becomes larger than the number of slave stations. A VBR data end judgment circuit 107 outputs a VBP end signal 108 when the VBR address counter 103 counts up to the value equal to or larger than the number of slave stations.

An address selection circuit 109 retains an address signal selected from signals output by the CBR address counter 102, VBR address counter 103 and ABR address counter 104 and outputs the address signal as a transmission address signal 111. The data type selection circuit 101 is used to select the data type which should be transmitted. Receiving the frame pulse 82, the data type selection circuit 101 is initialized and selects CBR as the data type. It further outputs a transmission data type signal 112 representing the selected data type. Receiving the frame pulse 82, the CBR address counter 102 and the VBR address counter 103 each initialize their count values. When the transmission trigger 86 is input, the counter corresponding to the selected data type is allowed to increment the count value by 1.

After inputting the frame pulse, the value of the CBR address counter increments by 1 at every input of the transmission trigger. At this time, the transmission data type signal 112 indicates the CBR as the selected data type. The transmission address signal 111 has a value output from the CBR address counter 102. Assuming that three slave stations are used, when the CBR address counter 102 counts up to "3", the CBR data end judgement circuit 105 outputs a CBR end signal 106. Receiving the CBR end signal 106, the data type selection circuit 101 switches the data type from CBR to VBR. The transmission data type signal 112 then indicates the VBR data. The value of the VBR address counter 103 is output as the transmission address. The value of the VBR address counter 103 will be incremented by "1" at every input of the transmission trigger signal.

When the count value of the VBR address counter 103 exceeds "3", a VBR data end judgment circuit 107 outputs the VBR end signal 108. When both the VBR end signal 108 and CBR end signal 106 have been generated, the data type selection circuit 101 switches the data type to ABR from the VBR. The transmission data type signal 112 now refers to the ABR. The transmission address signal 111 outputs the value of the ABR address counter 104. The count value of the ABR address is not initialized by the frame pulse 86. When counting the address of the last slave station, the count value is initialized. The slave station address is output in cyclic way. The data type and the slave station address are selected according to the sequence shown in FIG. 2.

Figure 8:
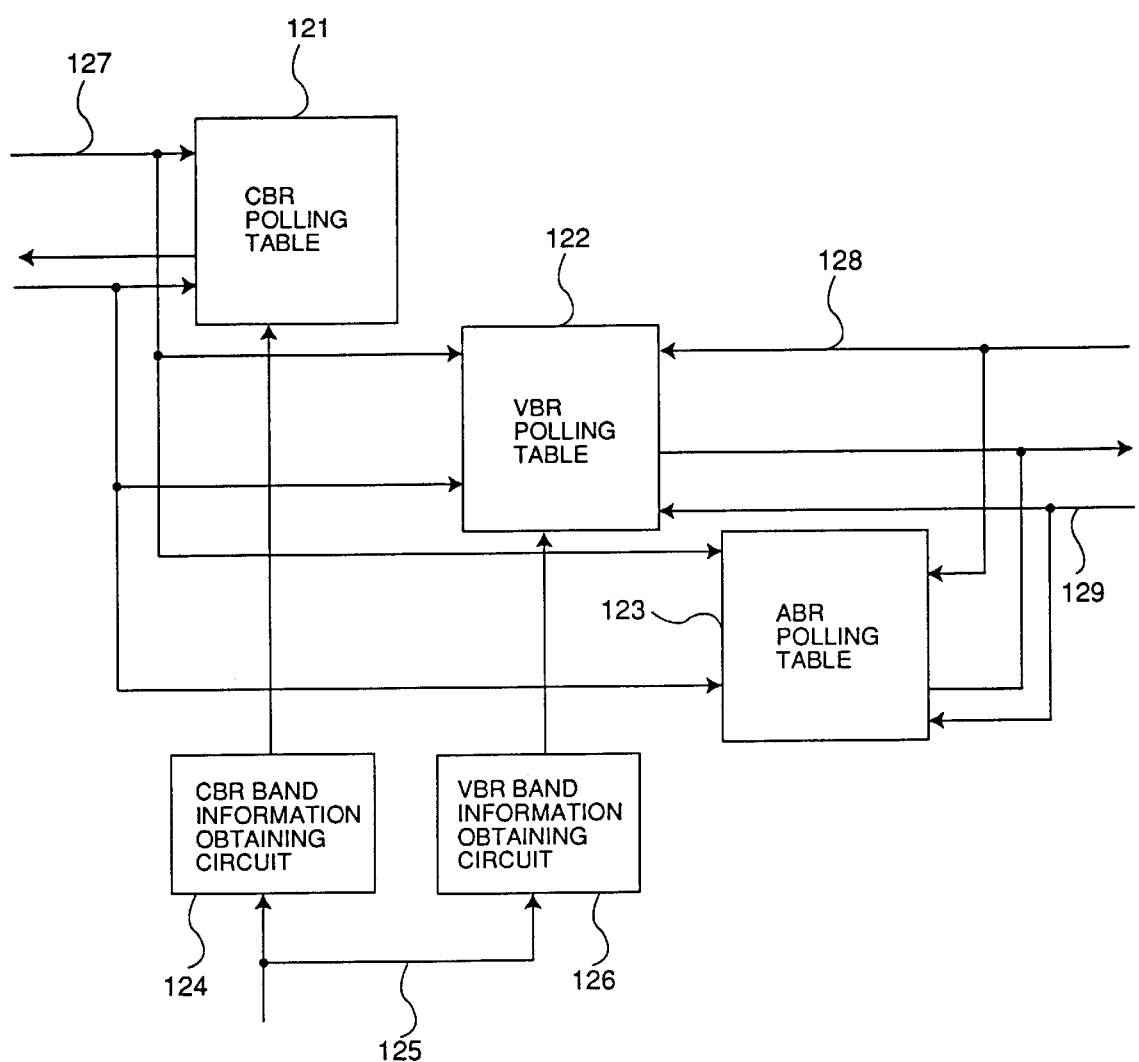
FIG. 8 is a block diagram of a circuit construction of a polling table shown in FIG. 5.

FIG. 8 shows a circuit construction of the polling table 73 shown in FIG. 5 in detail. The polling table 73 forms the circuit part where data for determining allocated amount of cells are stored. The polling table 73 includes a CBR polling table 121 for CBR data, VBR polling table 122 for VBR data and ABR polling table 123 for ABR data. A CBR bandwidth information obtaining circuit 124 obtains a constant amount of cells which will be sent to each slave station as the CBR data based on data 125 sent from the ATM exchange office 15. A VBR bandwidth information obtaining circuit 126 obtains average amount of cells which will be sent as the VBR data and maximum transmittable amount of cells from the ATM exchange office 15.

The polling tables 121 to 123 receive inputs of a transmission trigger signal, a transmission data type signal and a transmission address signal, respectively. These signals are referred to as signals 127. Various types of signals 128 are input to the VBR polling table 122 and ABR polling table 123 from the reception circuit 72 shown in FIG. 5. The input signals 128 include a reception data type signal representing the data type of the signal received from the slave station and a correct reception signal representing that the reception signal of the slave station acting as the transmitter is correctly received. The VBR polling table 122 and ABR polling table 123 receive required amount of cells signals 129 sent from each slave station.

FIG. 9 shows an example of the CBR polling table 121 of FIG. 8. In an address column 141, the address number allocated to each slave station is registered. In an average amount of cells column 142, the amount of cells of the CBR data allocated to each slave station at every frame is registered. This information has been derived from the CBR bandwidth information obtaining circuit 124 shown in FIG. 8. In a last allocated amount of cells column 143, the allocated amount of cells sent via the CBR polling signal is registered.

FIG. 10 shows an example of the VBR polling table 122 of FIG. 8. In an address column 151, the address number of each slave station is registered. In an average amount of cells column 152, the average amount of cells indicating the amount of cells guaranteeing the allocation at every frame is stored. In a maximum amount of cells column 153, transmittable maximum cell at every frame is registered. In a required amount of cells column 154, a value received from the reception circuit 72 shown in FIG. 5 is set. An explanation about how the required amount of cells is obtained will be described later. In a last allocated amount of cells columns $155_1$ to $155_{N-1}$, the amount of cells which have been allocated two to N-1 times before are set. These values are derived from the allocated amount of cells calculation circuit 85 illustrated in FIG. 6.

FIG. 11 shows an example of the ABR polling table 123 of FIG. 8. The ABR polling table 123 has an address column 161 for registering the slave station address, columns of required amount of cells 162 and last allocated amount of cells 163 per slave station. The required amount of cells is defined by the reception circuit 72 shown in FIG. 5. The last allocated amount of cells is derived from the allocated amount of cells calculation circuit 85 shown in FIG. 6.

In the circuit of FIG. 8, when the transmission data type signal 127 is supplied, the polling table corresponding thereto will be selected. Based on the transmission address signal 127, bandwidth information 129 of the slave station in the corresponded polling table is output. When the CBR polling table 121 is selected, the average amount of cells is output as the bandwidth information. When VBR polling table 123 is selected, the average amount of cells, maximum amount of cells, required amount of cells and amount of cells of the last to N-1 times before allocated are output as the bandwidth information. When the ABR polling table 123 is selected, the required amount of cells is output as the bandwidth information.

Next, the allocated amount of cells calculation circuit 85 of FIG. 6 is described.

Figure 12:
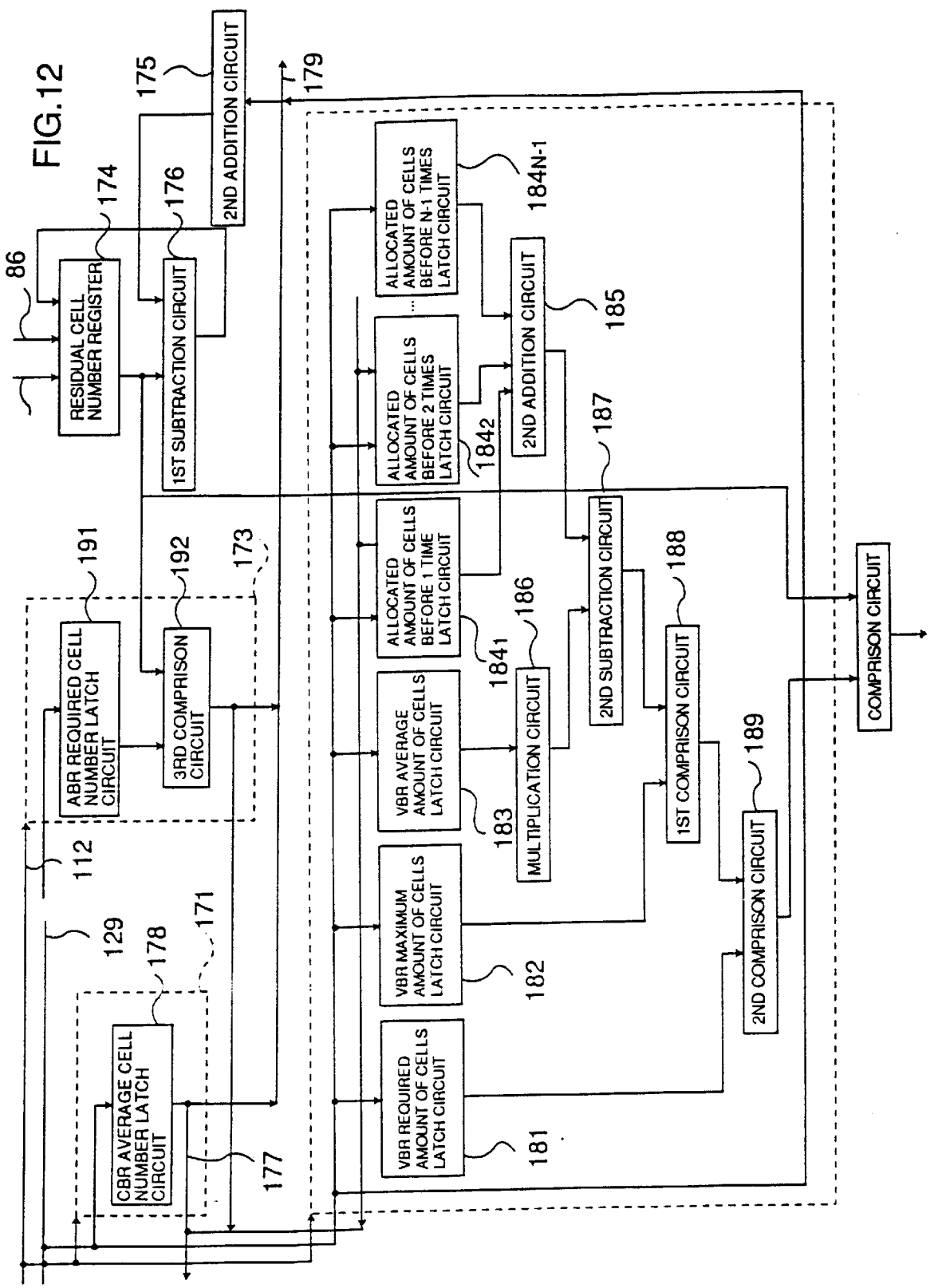
FIG. 12 is a block diagram showing a construction of an allocated amount of cells calculation circuit shown in FIG. 6.

FIG. 12 shows a construction of the allocated amount of cells calculation circuit 85 shown in FIG. 6 in detail. This circuit is formed of a CBR allocated amount of cells calculation circuit 171 for obtaining allocated amount of cells for the CBR data, VBR allocated amount of cells calculation circuit 173 for obtaining the allocated amount of cells for the VBR data and an ABR allocated amount of cells calculation circuit 173 for obtaining the allocated amount of cells for The ABR data as well as a residual amount of cells register 174 for counting the amount of cells left in one frame. This circuit 174 is further provided with a first addition circuit 175 for increasing by "1" the allocated amount of cells and a first subtraction circuit 176 for subtracting the allocated amount of cells added by "1" from the value stored in the residual amount of cells register 174.

The respective calculation circuits 171, 172 and 173 receive transmission data type signal 112 and bandwidth information 129. The residual amount of cells register 174 receives inputs of a frame pulse signal 82 and a transmission trigger 86. When the frame pulse 82 is input, the value of the residual amount of cells register 174 is initialized to the maximum amount of cells of a frame. Then the allocated amount of cells for CBR, VBR and ABR are sequentially obtained based on the transmission data type signal and bandwidth information. The allocated amount of cells is input to the PCI cell generation circuit 88 and the transmission control circuit 87 shown in FIG. 6. It is also stored in the polling table corresponding to the allocation information 177. The value added by 1 is subtracted from values registered in the residual amount of cells register 174 sequentially. The resultant numbers are retained in the residual amount of cells resister 174.

Construction and operation of each calculation circuit are described.

If the transmission data type signal 112 indicates the CBR, the CBR allocated amount of cells calculation circuit 171 is selected for calculation. The CBR allocated amount of cells calculation circuit 171 receives the average amount of cells as the bandwidth information which has been supplied from the CBR polling table 121 (FIG. 9). In this circuit 171, the value is retained in a CBR average amount of cells latch circuit 178. The retained value is output as an allocated amount of cells signal 179. The same value is also used as allocation information 177. It will be stored in the column of the last allocated amount of cells 143 of the slave station corresponding to the transmission address signal 112 in the CBR polling table 121.

If the transmission data type signal 112 indicates VBR, the VBR allocated amount of cells calculation circuit 172 is selected. This circuit is provided with various latch circuits for retaining various information which has been supplied from the VBR polling table 122 shown in FIG. 10. A VBR required amount of cells latch circuit 181 retains the required amount of cells. A VBR maximum amount of cells latch circuit 182 retains the maximum amount of cells. A VBR average amount of cells latch circuit 183 retains the value of average amount of cells which has been supplied from VBR polling table 122. Last allocated amount of cells latch circuits $184_1$ to $184_{N-1}$ retain the amount of cells of the last to (N-1) time before allocated amount of cells, respectively.

A second addition circuit 185 obtains the total of the values which have been retained by the last to (N-1) times before allocated amount of cells latch circuits $184_1$ to $184N_{-1}$. A multiplication circuit 186 multiplies N by the value retained in the VBR average amount of cells latch circuit 183. Outputs of the multiplication circuit 186 and the second addition circuit 185 are input to a second subtraction circuit 187. The second subtraction circuit 187 subtracts the output value of the second addition circuit 185 from the output value of the multiplication circuit 186. Subtraction result of the second subtraction circuit 187 and output value of the VBR maximum amount of cells latch circuit 182 are input to a first comparison circuit 188. The comparison result of the first comparison circuit 188 and the output value of the VBR required amount of cells latch circuit 181 are input to a second comparison circuit 189. The comparison result of the second comparison circuit 189 and the output of the residual amount of cells register 174 are input to the comparison circuit 190. The comparison result of the comparison circuit 190 is used as an allocated amount of cells signal 179 and allocation information 177.

When the VBR is designated by the transmission data type signal 112, the VBR polling table 122 shown in FIG. 10 provides the bandwidth information including the average amount of cells, maximum amount of cells, required amount of cells and amount of cells of the last to (N−1) times before allocated, These values are retained in the corresponded latch circuit in the VBR allocated amount of cells calculation circuit 172. Calculation of the allocated amount of cells is executed in three stages. As the first stage, the amount of cells guaranteeing average bandwidth is obtained by the following equation:

Cell number guaranteeing average bandwidth=average amount of cells×N−Σ(N−1) times before allocated amount of cells    (1)

Total of allocated numbers of the last to (N−1) times before allocated cells are derived from the second addition circuit 185. The obtained value is subtracted from the value resulted from multiplying N by the average amount of cells in the second subtraction circuit 187. In case of allocating the obtained amount of cells next time, the average amount of cells can be guaranteed.

Since the amount of cells exceeding the maximum one cannot be allocated in one frame, it is determined whether or not the obtained amount of cells is smaller than the maximum amount of cells. If the average guaranteed amount of cells is equal to or smaller than the maximum amount of cells, it is regarded as the allocatable amount of cells. If the average guaranteed amount of cells is larger than the maximum amount of cells, the maximum amount of cells is regarded as the allocatable amount of cells. This can be obtained from comparing the value retained in the VBR maximum amount of cells latch circuit 182 with the subtraction result of the second subtraction circuit 187 in the first comparison circuit 188. As a result of the comparison, the smaller value is output.

Finally the residual amount of cells is compared with the allocatable amount of cells. The smaller value is regarded as the allocated amount of cells. More specifically, if it is determined that the residual amount of cells is equal to or smaller than the allocatable amount of cells, the residual number is regarded as the allocated amount of cells. While if it is determined that the residual amount of cells is larger than the allocatable amount of cells, the allocatable amount of cells is regarded as the allocated amount of cells. This can be obtained from comparing the comparison result of the second comparison circuit 189 with the value output from the residual amount of cells register 174 in the comparison circuit 190. The comparison circuit 190 outputs the smaller value as the result of comparison.

After the above calculations, the allocated amount of cells is stored in the VBR polling table 122 for the next calculation. The allocated amount of cells and values of the last to (N−2) times before allocated amount of cells retained in the respective latch circuits are output as the allocation information. The last to (N−2) times before allocated amount of cells are shifted by one into two times before to (N−1) before allocated amount of cells, which is retained in the VBR polling table 122. The obtained allocated amount of cells is stored in the column as the last allocated amount of cells.

Next, the ABR allocated amount of cells calculation circuit 173 shown in FIG. 12 is described. When the ABR data are designated by the transmission data type signal 112, the ABR allocated amount of cells calculation circuit 173 receives the required amount of cells as the bandwidth information supplied from the ABR polling table 123 shown in FIG. 11. This value is retained in the ABR required amount of cells latch circuit 191. A third comparison circuit 192 compares the value of the residual amount of cells with the required amount of cells. As a result of the comparison, the smaller value is output in the form of the allocated amount of cells signal 179 and the allocation information 177. The allocated amount of cells output as the comparison result is stored in the column 163 of the last allocated amount of cells in the ABR polling table 123.

The operation of the transmission circuit 71 (see FIG. 5) is explained referring to FIG. 6. When the frame pulse 82 is output, the data type/address generation circuit 84 outputs a signal indicating the CBR as the transmission data type and the first slave station as the transmission address. The allocated amount of cells calculation circuit 85 outputs the allocated amount of cells 179 according to the CBR polling table 121 shown in FIG. 9. Upon receiving an input of the transmission trigger 86 from the transmission trigger generation circuit 83, the PCI cell generation circuit 88 produces a control information cell having a format shown in FIG. 3. The address is set based on the transmission address signal 111. The data type is set based on the transmission data type signal 112. The allocated amount of cells is set based on the allocated amount of cells signal 179 which has been input from the allocated amount of cells calculation circuit 85.

The PCI cell/data cell multiplication circuit 91 receives a control signal 95 for switching the destination of the multiplied cell which has been input by the transmission control circuit 87. When the transmission trigger 86 is input, the destination of the cell is switched to the PCI cell generation circuit 88 for the period equivalent to the process of one cell. The transmission control circuit 87 counts time for the length equivalent to the allocated amount of cells. During this period, the input destination of the circuit 91 is switched to the cell buffer 93 or the empty cell generation circuit 94. The PCI cell/data cell multiplication circuit 91 transmits the data cell equivalent to the allocated amount of cells to the broadcasting channel 13 after one control information cell. Counting the time equivalent to the allocated amount of cells, the transmission control circuit 87 outputs the data cell end signal 89. Responding to this signal, the transmission trigger generation circuit 83 outputs the next transmission trigger signal. The transmission address or transmission data type can be updated if necessary, which allows the master station to transmit polling signals to the slave stations one after another.

Figure 13:
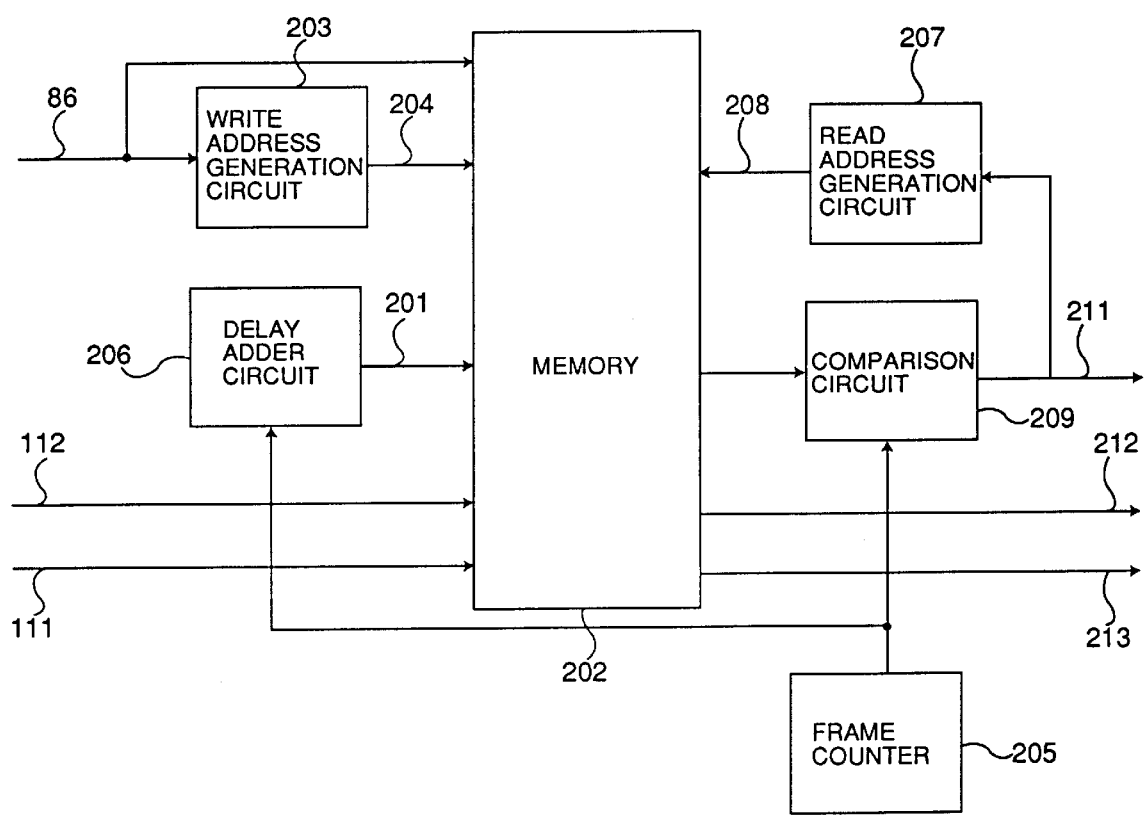
FIG. 13 is a block diagram showing a construction of a delay circuit shown in FIG. 5.

FIG. 13 shows a construction of the delay circuit 74, shown in FIG. 5, in detail. This circuit generates a signal indicating the timing for the cell transmission from the slave station on the multiple access channel 14 based on the time when the polling signal has been transmitted on the broadcasting channel 13. The transmission data type 112, transmission address 111 and expected reception time 201 are stored in a memory 202. A write address generation circuit 203 outputs a write address 204 indicating the area in which data are written. The write address is designed to be updated to the next write address at every input of the transmission trigger signal 86. The frame counter 205 measures the elapse of time from output of the frame pulse 82 in units of a cell. For example, the elapse of time is equivalent to the length allowing for transmission of 5 cells, the frame counter 205 counts "5".

The delay addition circuit 206 outputs a signal of expected reception time 201 which has been calculated by adding a predetermined value as a delay time to the count value of the frame counter 205. For example, it is assumed that the frame counter 205 counts "8" when the transmission trigger is output and the expected reception time will be at the count of "10" cells. In the above case, the delay circuit 206 adds "8" to "10" and outputs "18" as the expected reception time.

The read-out address generation circuit 207 outputs the read-out address of the data stored in the memory 202. The comparison circuit 209 compares the expected reception time read from the memory with the count value of the frame counter 205. For example, if the frame counter 205 counts "8", "18" is read as the expected reception time 201 from the memory 202. This value is then compared with the current count value of the frame counter 205. If the count value of the frame counter 205 corresponds with the expected reception time which has been read out, the comparison circuit 209 outputs a reception trigger 211. Upon receiving the reception trigger 211, the read out address generation circuit 207 updates the read-out address of the memory to the next address.

The expected reception time 201, transmission data type and transmission address are sequentially stored in the updated address area at every input of the transmission trigger 86. When time reaches the expected reception time 201 which has been read from the memory, the reception trigger 211 is output and the next expected reception time, reception data type 212 and reception address 213 are read out. This circuit generates the reception trigger signals 211 indicating the timing when the data are sent from the slave station as the destination of the polling signal. The reception trigger 211, reception data type 212 and reception address 213 are supplied to the reception circuit 72 and the polling table 73 shown in FIG. 5. Upon receiving these signals, the polling table 73 selects the table corresponded with the reception data type and supplies the last allocated amount of cells of the slave station corresponding to the supplied reception address to the reception circuit 72.

Figure 14:
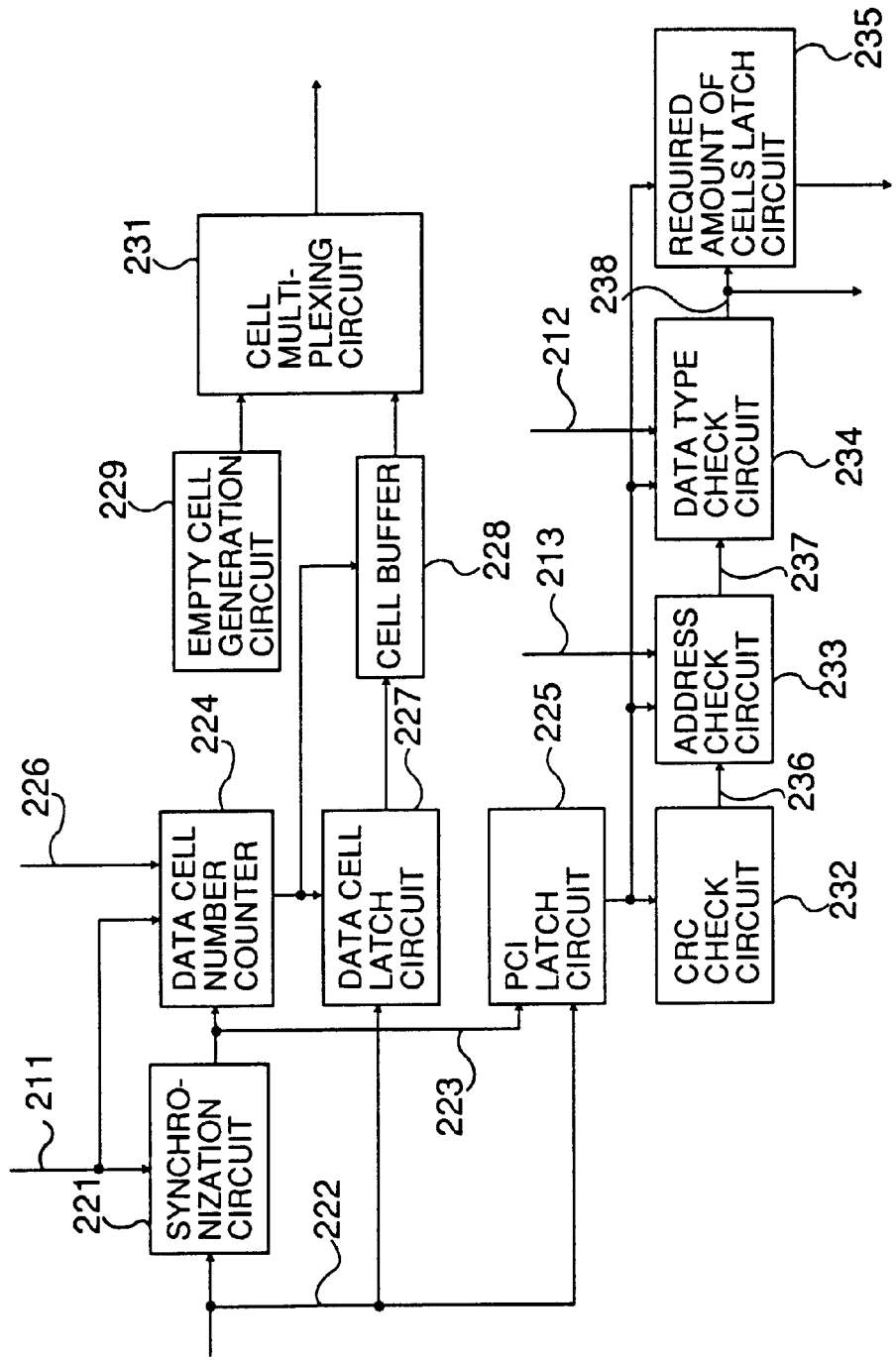
FIG. 14 is a block diagram showing a construction of a reception circuit shown in FIG. 5.

FIG. 14 shows a construction of the reception circuit 72, shown in FIG. 5, in detail. This circuit 72 receives each cell by synchronizing burst signals transmitted on the multiple access channel 14. A sync. circuit 221 for detecting sync. terms shown in FIG. 4 receives inputs of a reception signal 222 transmitted on the multiple access channel 14 and a reception trigger 211 sent from the delay circuit 74 shown in FIG. 13. Detecting the sync. term, the sync. circuit 221 outputs a sync. signal 223. As a result, sequential location of the burst signal sent from the slave station can be identified. If no sync. term is detected, the burst signal is ignored.

The sync. signal $22_3$ is input to a data amount of cells counter 224 for counting incoming data amount of cells and the PCI latch circuit 225 for retaining the control information cell. The data cell counter 224 receives an input of the signal 226 indicating the last allocated amount of cells from the polling table. The data amount of cells counter 224 latches the last allocated amount of cells when the sync. signal 223 is input. It decreases the count value at every arrival of a data cell. The data cell latch circuit 227 latches the data cell transmitted after the control information cell until the data amount of cells counter 224 equals "0". The cell latched by the data cell latch circuit 227 is input to the cell buffer 228. Signals output from the cell buffer 228 and empty cell generation circuit 229 are input to a cell multiplexing circuit 231. The cell multiplexing circuit 231 outputs the cell which is present in the cell buffer 228. If no cell is present in the cell buffer 228, this circuit 231 transmits a dummy cell which has been output by the empty cell generation circuit 229 to the ATM exchange office 15 shown in FIG. 5.

Output signals of the PCI latch circuit 225 are input to a CRC check circuit 232, an address check circuit 233, data type check circuit 234 and a required amount of cells latch circuit 235. The CRC check circuit 232 generates a cycle redundancy code based on the address 57, data type 58 and required amount of cells 59 of the control information shown in FIG. 4. The value of the obtained code is compared with the CRC code 61 (see FIG. 4). When they correspond, a CRC correspondence signal 236 is input to the address check circuit 233. Upon receiving the CRC correspondence signal 236, the address check circuit 233 compares the value of the reception address 213 supplied from the delay circuit 74 (see FIG. 5) with the value of the received address 57 of the control information. When they correspond, an address correspondence signal 237 is input to the data type check circuit 234.

Upon receiving the address correspondence signal 237, the data type check circuit 234 compares the reception data type 212 supplied from the delay circuit 74 (see FIG. 5) with the data type 58 of the received control information. When they correspond, this circuit 234 outputs a correct reception signal 238 indicating that the control information cell is correctly received. The correct reception signal 238 is input to the required amount of cells latch circuit 235 and the polling table 73. The required amount of cells latch circuit 235 retains the value of the required amount of cells 59 of the control information cell which has been received at input of the correct reception signal 238. The output of the required amount of cells latch circuit 235 is input to the polling table 73.

If the reception data type supplied from the delay circuit 74 indicates the CBR when the correct reception signal 238 is supplied, the VBR polling table 122 is selected. If the reception data type indicates VBR or ABR, the ABR polling table 123 is selected. The information containing the required amount of cells is written to the location corresponding to the supplied reception address. The next required amount of cells sent from the slave station is, thus, sequentially registered in the polling table 73.

The construction of a slave station $12_1$ to $12_3$ shown in FIG. 1 is described.

Figure 15:
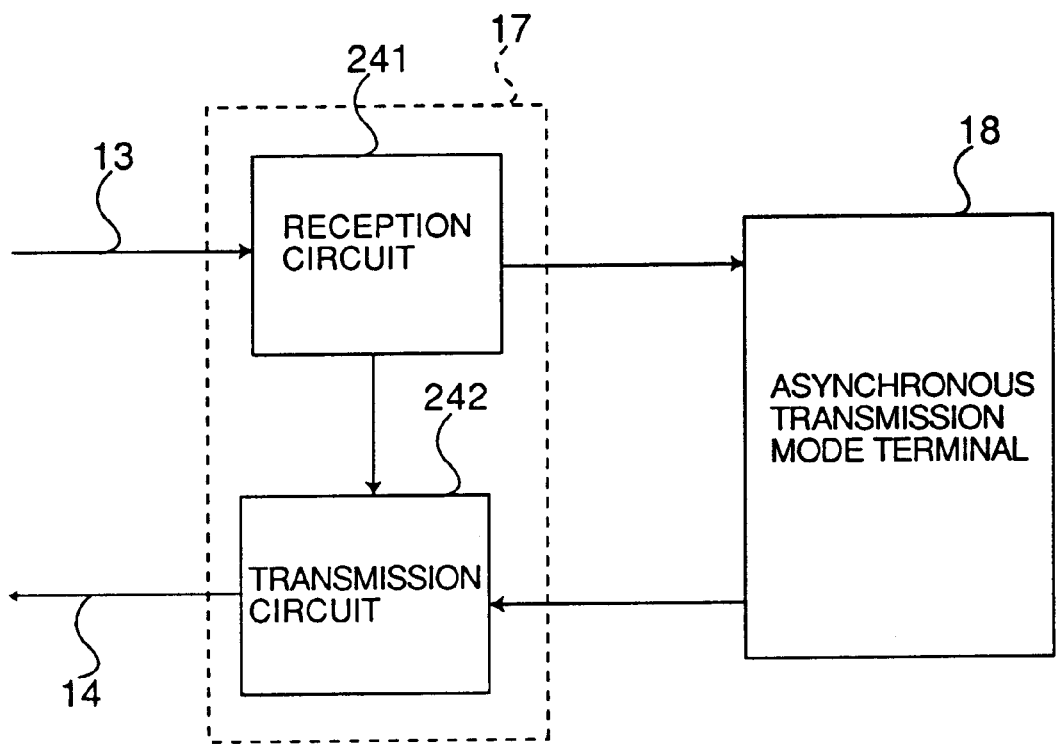
FIG. 15 is a block diagram showing a configuration of the slave station shown in FIG. 1.

FIG. 15 shows a schematic view of the construction of the slave station shown in FIG. 1. Each slave station comprises a slave station access control unit 17 and an ATM terminal 18. The slave station access control unit 17 comprises a reception circuit 241 for receiving the cell sent from the master station 11 on the broadcasting channel 13 and a transmission circuit 242 for transmitting the cell to the master station 11 on the multiple access channel 14.

Figure 16:
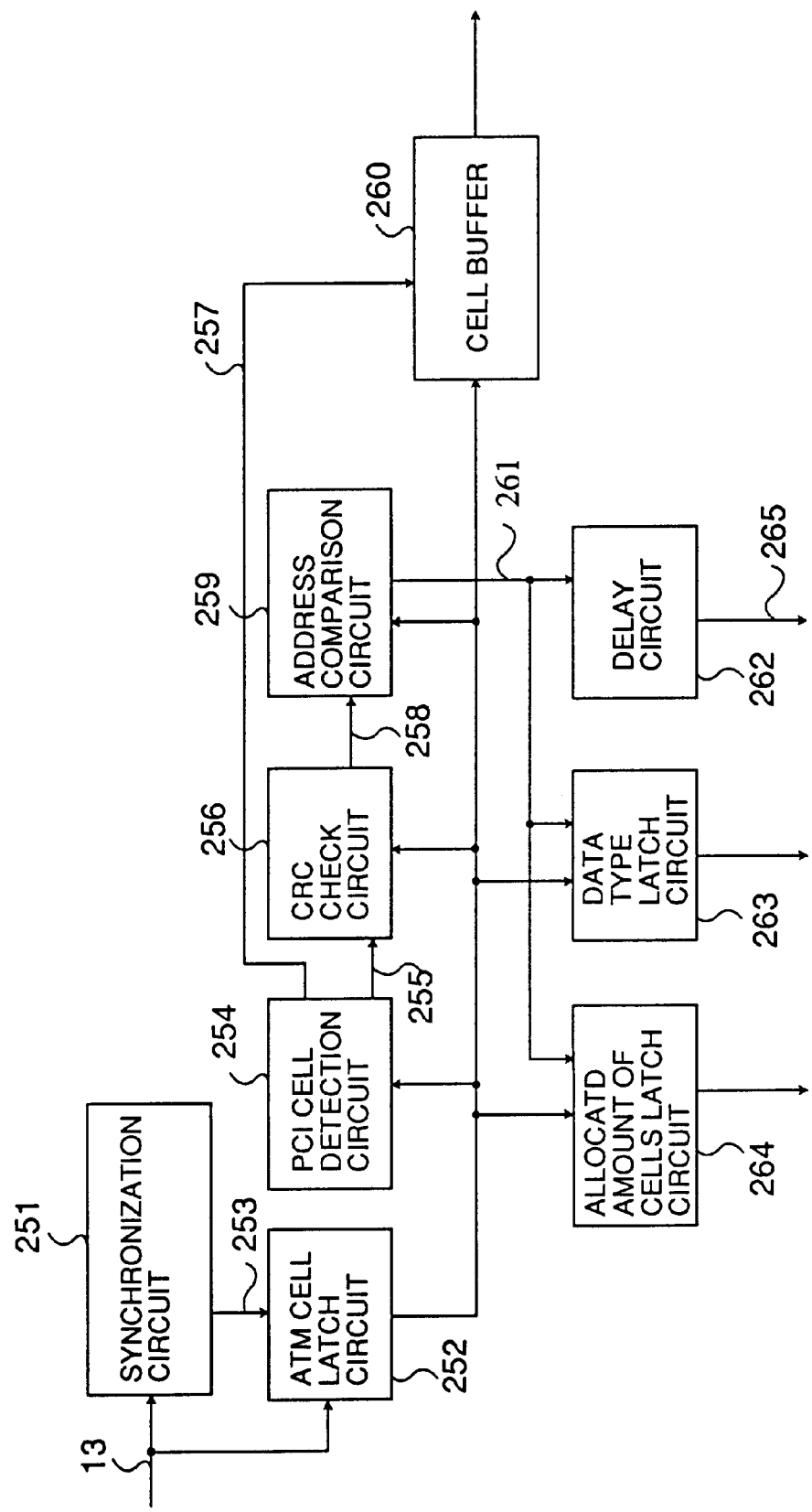
FIG. 16 is a block diagram showing configuration of the reception circuit shown in FIG. 15.

FIG. 16 shows the construction of the reception circuit 241 shown in FIG. 15. A reception signal sent the broadcasting channel 13 is input to a sync. circuit 251 and an ATM cell latch circuit 252. The sync. circuit 251 detects the location of the cell in the transmitted signal and outputs a sync. signal 253 indicating the head of the cell. The ATM latch circuit 252 latches the cell transmitted accompanied with the sync. signal 253. The PCI cell detection circuit 254 detects the control information (PCI) cell based on the values of the virtual pass identifier (VPI) and the virtual channel identifier contained in the respective cells. When the control information cell is detected, the PCI detection signal 255 is input to the CRC check circuit 256. When a cell other than the PCI cell is detected, the data latch signal 257 is output by PCI cell detection circuit 254. The data cell latch signal 257 is input to the cell buffer 260.

Receiving the PCI detection signal 255, the CRC check circuit 256 generates a cycle redundancy code based on values of the address, data type and allocated amount of cells contained in the payload of the cell and compares the code with the CRC code in the payload. When they correspond, it is recognized that the data contained in the payload have no error. Then the CRC correspondence signal 258 is input to the address comparison circuit 259. Receiving the CRC correspondence signal 258, the address comparison circuit 259 compares the address contained in the payload with the currently allocated address number. When they correspond, a reception trigger 261 is output.

The reception trigger 261 is input to a delay circuit 262, a data type latch circuit 263 and an allocated amount of cells latch circuit 264. Upon receiving the reception trigger 261, the delay circuit 262 adjusts the time for outputting the cell depending on the distance between the slave and master station. When networking is established, the transmission distance between the master and slave stations is measured. Based on the measured distance, the delay period for preventing collision of cells is set as the initial value. After the reception trigger 261 is input, the transmission trigger 265 is output with the elapse of the delay period. Receiving the reception trigger 261, the data type latch circuit 263 retains the data type contained in the payload. Receiving the reception trigger signal 261, the allocated amount of cells latch circuit 264 retains the allocated amount of cells contained in the payload.

The reception circuit 241 generates the sync. signal 253 from the reception signal input through the broadcasting channel 13 and latches the transmitted cell. This circuit 241 further detects the control information cell and determines if the payload has any errors. If there is no error, it is judged whether the cell is correctly addressed contained or not based on the address contained in the payload. If the cell is correctly addressed, information of the data type and allocated amount of cells contained in the payload is retained. The data cell transmitted after the control information cell is input to the cell buffer 260. The data accumulated in the cell buffer are designed to be read out by the ATM terminal 18.

Figure 17:
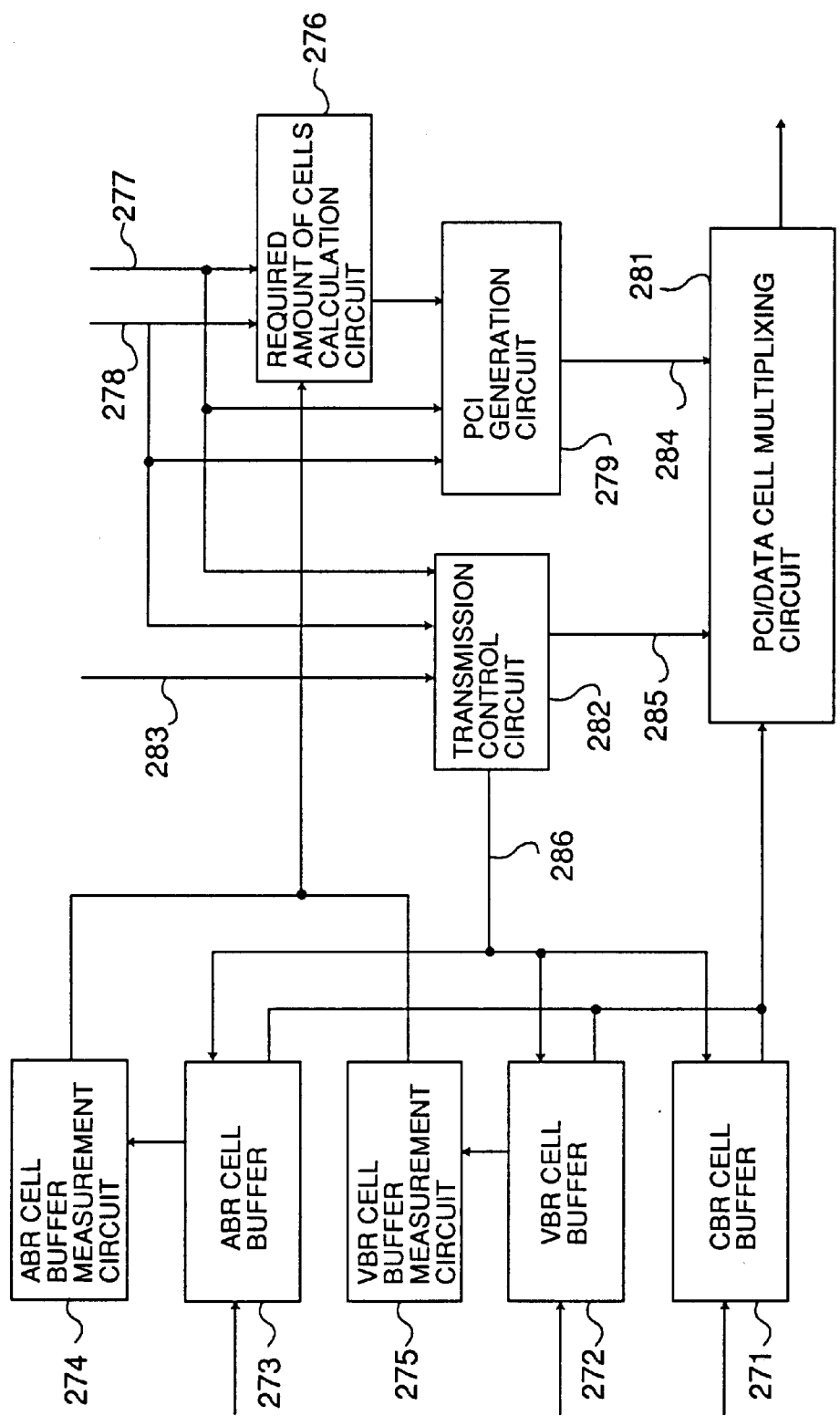
FIG. 17 is a block diagram showing configuration of the transmission circuit shown in FIG. 15.

FIG. 17 shows a construction of the transmission circuit 242 shown in FIG. 15. The transmission circuit 242 is provided with cell buffers for buffering the data cell supplied from the ATM terminal 18. The cell buffers includes a CBR cell buffer 271 for accumulating the CBR data a VBR cell buffer 272 for accumulating the VBR data and an ABR cell buffer 273 for accumulating the ABR data. The ABR cell buffer 273 is connected to an ABR cell buffer measuring circuit 274 for counting the number of accumulated cells. The VBR cell buffer 272 is connected to a VBR cell buffer measuring circuit 275 for counting the number of accumulated cells.

Measurement values of the circuits 274 and 275 are input to the required amount of cells calculation circuit 276 as the bandwidth information. The required amount of cells calculation circuit 276 receives inputs of the transmission trigger signal 265 which has been sent from the delay circuit 262 shown in FIG. 16 and a data type signal 278 which has been sent from the data type latch circuit 263 shown in FIG. 16. The required amount of cells calculation circuit 276 obtains the next required amount of cells of the respective data types based on measurement values of the cell buffer measuring circuits 274 and 275. The PCI generation circuit 279 generates the control information cell transmitted to the multiple access channel 14. The PCI/data cell multiplexing circuit 281 multiplexes the control information cell and data cells of the respective cell buffers 271 to 273, which are transmitted to the multiple access circuit 14.

The transmission control circuit 282 indicates the transmission of either the data cell or control information cell to the PCI/data cell multiplexing circuit 281. This transmission control circuit 282 selects one buffer from the CBR cell buffer 271, the VBR cell buffer 272 and the ABR cell buffer 273 based on the received data type signal 278. This circuit 281 has an input of the allocated amount of cells signal 283 representing the allocated amount of cells from the allocated amount of cells latch circuit 264 shown in FIG. 16. The transmission control circuit 282 counts the number of cells sent from the selected buffer as 271–273 specified by the allocated amount of cells signal 283.

Upon receiving the input of the transmission trigger 265, the required amount of cells calculation circuit 276 counts the required amount of cells which corresponds with the data type. If the data type signal 278 indicates the CBR, the measurement value of the VBR cell buffer measuring circuit 275 is set as the required amount of cells. If the data type signal 278 indicates the VBR or ABR, the measurement value of the ABR cell buffer measuring circuit 274 is set as the required amount of cells. The required amount of cells is input to the PCI generation circuit 279. The control information cell 52, as shown in FIG. 4, is then produced. Receiving the transmission trigger 265, the transmission control circuit 282 outputs a control signal 285 so as to select the control information cell 284 as the transmitted cell. Next, the transmission control circuit 282 loads the allocated amount of cells 283 in the inner counter (not shown) for subtraction in unit of cell/time. After the control information cell is transmitted, the control signal 285 is switched for transmitting the data cells until the count value reaches "0". The transmission control circuit 282 transmits the buffer selection signal 286 accompanied with the data type signal 278 and transmits the data cell to the multiple access channel 14 from the cell buffer 271–273 corresponding to the data type.

In the above embodiment, three slave stations have been described. However the present invention does not limit the number of connected slave stations. Although this embodiment specifies that 100 cells contained in a frame are transmitted, the frame length is not so limited. The frame length is defined by the transmission bandwidth.

According to the present invention, the bandwidth allocation is conducted to the data with higher to lower priorities sequentially. Even though various types of data having different priorities are mixed, they can be transmitted with excellent traffic characteristics.

As a result of the priority allocation described herein, the first priority data are not allocated with excessive bandwidth, resulting in efficient bandwidth allocation in demand.

Moreover, according to the present invention, three different types of data, constant bandwidth data (CBR), variable bandwidth (VBR) data and available bit data (ABR), are transmitted in this priority order. These data are often mixed in the communication at asynchronous transfer mode. However, they can be transmitted sequentially from higher to lower priority orders, resulting in excellent traffic characteristics.

Furthermore, according to the present invention, the CBR data are allocated with its constant bandwidth. The VBR are allocated with the bandwidth equivalent to the smallest value selected from the bandwidth required for realizing constant average bandwidth, maximum bandwidth and the bandwidth required by the slave station. The ABR data are allocated with the bandwidth equivalent to the smallest value selected from the residual bandwidth and the bandwidth required from the slave station. In this way, different types of data can be transmitted with exellent traffic characteristics.

According to the fifth aspect of the invention, at a timing when one slave station completes data transmission, the master station transmits a polling signal to the next slave station. As a result, the data supplied from the slave stations can be multiplexed efficiently, leaving no gap on the channel.

What is claimed is:

1. A multiple access communication system for communicating various types of data with a polling method between a master station and a plurality of slave stations, said master stations comprising:

means for setting a periodic frame;

receiving means for simultaneously receiving from at least one of said slave stations a first data transmission and a bandwidth request related a second data transmission;

a bandwidth allocation means responsive to said bandwidth request for allocating a certain amount of bandwidth within said frame to each of said slave stations in order of priority that is determined based on data types; and an instruction means for transmitting an instruction to the at least one slave station to enable the at least one slave station to transmit data equivalent to said certain amount of bandwidth allocated for each data by said bandwidth allocation means at every frame.

2. The multiple access communication system of claim 1, wherein each of said slave stations comprises means for transmitting said bandwidth request including type and amount of data to be transmitted to said master station.

3. The multiple access communication system of claim 1, wherein said data transmitted from said slave station have three types, a constant bit rate data type where a bandwidth within a frame is fixed, a variable bit rate data type where a bandwidth can vary but an average of said bandwidth must be larger than a preset value and an available bit rate data type wherein the bandwidth is freely variable; and said bandwidth allocation means allocates a bandwidth to said constant bit rate data type said variable bit rate data type and said available bit rate data, type in that order.

4. The multiple access communication system of claim 1, wherein said data transmitted from said slave station have three types, a constant bit rate data type where said requested bandwidth within a frame is fixed, a variable bit rate data type where said requested a bandwidth can vary but an average of said requested bandwidth must be larger than a preset value and an available bit rate data type wherein the requested bandwidth is freely variable; and wherein said bandwidth allocation means:

firstly allocates a constant bandwidth selected from an available bandwidth within a frame as said constant bit rate data type;

secondly allocates a smallest bandwidth selected from among a bandwidth calculated by subtracting an allocated bandwidth from the available bandwidth within a frame, a bandwidth that is needed to make an averaged bandwidth be said preset value of bandwidth, a maximum bandwidth that is possible to be set for a slave station and a bandwidth required by a slave station as said variable bit rate data type; and finally allocates a smaller bandwidth of a bandwidth calculated by subtracting an allocated bandwidth from the available bandwidth within a frame and a bandwidth required by a slave station as said available bit rate data type.

5. The multiple access communication system of claim 1, wherein each of said slave stations comprises means for transmitting data equivalent to a bandwidth as instructed by said instruction means; and said instruction means transmits an instruction to a slave station, and transmits another instruction to a next slave station after a time interval corresponding to said certain amount of bandwidth as instructed by the instruction means to said slave station.

6. The multiple access communication system of claim 1, wherein said multiple access communication is conducted in an asynchronous transmission mode.

7. A multiple access communication system for use with a polling method for transmitting and receiving three types of data, a constant bit rate data of which allocated bandwidth within a frame is fixed, a variable bit rate data of which allocated bandwidth can vary but an average of said allocated bandwidth must be larger than a preset value and an available bit rate data of which allocated bandwidth is freely variable, between a master station and a plurality of slave stations, wherein each of said slave stations comprises:

means for transmitting data information indicating a data type of data to be transmitted among said constant bit rate, said variable bit rate and said available bit rate data, and data amount to be transmitted; and means for transmitting data as instructed by said master station for each data type; and said master station comprises:

means for setting a periodic frame;

bandwidth allocation means firstly allocating a constant bandwidth selected from an available bandwidth within said frame as said constant bit rate data, secondly allocating a smallest bandwidth selected from among a bandwidth calculated by subtracting an allocated bandwidth from the available bandwidth within said frame, a bandwidth that is needed to make an averaged bandwidth be said preset value of bandwidth, a maximum bandwidth that is possible to be set for one of said plurality of slave stations and a bandwidth required by said one slave station as said variable bit rate data, and finally allocating a smaller bandwidth of a bandwidth calculated by subtracting an allocated bandwidth from the available bandwidth within a frame and a bandwidth required by said one slave station as said available bit rate data; and instruction means for transmitting an instruction to transmit data equivalent to a bandwidth allocated by said bandwidth allocation means to a slave station for each frame.

8. The multiple access communication system of claim 7, wherein said instruction means transmits an instruction to a slave station, and transmits another instruction to a next slave station after a time interval corresponding to a bandwidth allocated to said slave station.

9. The multiple access communication system of claim 7, wherein said multiple access communication is conducted in an asynchronous transmission mode.

10. A method for multiple access communication for communicating various types of data with a polling method between a master station and a plurality of slave stations, said method comprising the steps of:

setting a periodic frame in said master station;

simultaneously transmitting from at least one of said slave stations to said master station current data and a bandwidth allocation request related to a next data transmission;

allocating in said master station a certain amount of bandwidth transmittable within said frame to each of said slave stations in order of priority that is determined based on data types;

transmitting an instruction to transmit data equivalent to an allocated bandwidth to each of said slave stations from said master station; and transmitting data equivalent to said allocated bandwidth as instructed by said master station from each of said slave stations.

11. The method for multiple access communication of claim 10, wherein said data transmitted from said slave station have three types, a constant bit rate data type where allocated bandwidth within a frame is fixed, a variable bit rate data type where allocated bandwidth can vary but an average of said allocated bandwidth must be larger than a preset value and an available bit rate data type where allocated bandwidth is allocated in a best effort manner.

12. The method for multiple access communication of claim 11, wherein said step of allocating bandwidth allocates a bandwidth to said constant bit rate data, type said variable bit rate data type and said available bit rate data, type in that order.

13. The method for multiple access communication of claim 11, wherein said step of allocating bandwidth comprises the steps of:

allocating a constant bandwidth selected from an available bandwidth within frame for transmitting said constant bit rate data type;

allocating a smallest bandwidth selected from among a bandwidth calculated by subtracting an allocated bandwidth from the available bandwidth within said frame, a bandwidth that is needed to make an averaged bandwidth of said variable bandwidth data be said preset value of bandwidth, a maximum bandwidth that is possible to be set for a slave station and a bandwidth required by a slave station for transmitting said variable bit rate data type; and allocating a smaller bandwidth of a bandwidth calculated by subtracting an allocated bandwidth from the available bandwidth within said frame and a bandwidth required by a slave station for transmitting said available bit rate data type.

14. The method for multiple access communication of claim 11, wherein said bandwidth allocation request from said at least one slave station includes type and amount of data to be transmitted in a next frame to said master station.

15. The method for multiple access communication of claim 10, wherein said multiple access communication is conducted in an asynchronous transmission mode.

16. A method for multiple access communication for use with a polling method for transmitting and receiving three types of data, a constant bit rate data of which bandwidth within a frame is fixed, a variable bit rate data of which bandwidth can vary but an average of said bandwidth must be larger than preset value and an available bit rate data wherein the bandwidth is freely variable, between a master station and a plurality of slave stations, said method comprising the steps of:

setting a periodic frame in said master station;

allocating a constant bandwidth selected from an available bandwidth within said frame for transmitting said constant bit rate data;

transmitting an instruction to transmit data equivalent to a bandwidth allocated for transmitting said constant bit rate data to a slave station from said master station;

transmitting a constant bit rate data equivalent to a bandwidth as instructed by said master station an bandwidth request information indicating that next transmission is for a variable bit rate data and data amount of said variable bit rate data to be transmitted from said slave station;

allocating a smallest bandwidth selected from among a bandwidth calculated by subtracting an allocated bandwidth from the available bandwidth within frame, a bandwidth that is needed to make an averaged bandwidth of said variable bit rate data be said preset value of bandwidth, a maximum bandwidth that is possible to be set for a slave station and a bandwidth required by a slave station based on said bandwidth request information for transmitting said variable bit rate data, and transmitting an instruction to transmit data equivalent to a bandwidth allocated for transmitting said variable bit rate data to said slave station from said master station;

transmitting a variable bit rate data equivalent to a bandwidth as instructed by said master station and bandwidth request information indicating that next transmission is for an available bit rate data and data amount of said available bit rate data to be transmitted from said slave station;

allocating a smaller bandwidth of a bandwidth calculated by subtracting an allocated bandwidth from the available bandwidth within a frame and a bandwidth required by a slave station for transmitting said available bit rate data in said master station;

transmitting an instruction to transmit data equivalent to a bandwidth allocated for transmitting said available bit rate data to said slave station from said master station; and transmitting an available bit rate data equivalent to a bandwidth as instructed by said mater station and bandwidth request information indicating that next transmission is for a constant bit rate data and data amount of said constant bit rate data to be transmitted from said slave station.

17. A multiple access communication system for communicating various types of data with a polling method between a master station and a plurality of slave stations, said master station comprising:

a periodic frame setter setting a periodic frame;

a reception circuit for simultaneously receiving from at least one of said slave stations current data and a bandwidth allocation request related to a next data transmission;

a bandwidth allocator coupled to said periodic frame setter and coupled to said reception circuit, said bandwidth allocator allocating a certain amount of bandwidth within said frame to each of said slave stations in order of priority that is determined based on data types; and an instruction transmitter transmitting an instruction to a slave station to enable the slave station to transmit data equivalent to a bandwidth allocated for each data by said bandwidth allocator at every frame.

18. The multiple access communication system of claim 17, wherein each of said slave stations comprises a transmitter for transmitting said bandwidth allocation request including type and amount of data to be transmitted to said master station; and said bandwidth allocator further comprises a bandwidth setter for setting a bandwidth to be allocated based on said received bandwidth allocation request in order of said priority.

19. The multiple access communication system of claim 17, wherein
   said data transmitted from said slave station have three types, a constant bit rate data type where a bandwidth within a fame is fixed, a variable bit rate data type where a bandwidth can vary but an average of said bandwidth must be larger than a preset value and an available bit rate data type wherein the bandwidth is freely variable; and
   said bandwidth allocator allocates a bandwidth to said constant bit rate data, said variable bit rate data and said available bit rate data, in that order.

20. The multiple access communication system of claim 17, wherein
   said data transmitted from said slave station have three types, a constant bit rate data type where a bandwidth within a frame is fixed, a variable bit rate data type where a bandwidth can vary but an average of said bandwidth must be larger than a preset value and an available bit rate data type wherein the bandwidth is freely variable; and wherein
   said bandwidth allocator:
      firstly allocates a constant bandwidth selected from the remaining bandwidth within a frame as said constant bit rate data;
      secondly allocates a smallest bandwidth selected from among a bandwidth calculated by subtracting an allocated bandwidth from the remaining bandwidth within a frame, a bandwidth that is needed to make an averaged bandwidth be said preset value of bandwidth, a maximum bandwidth that is possible to be set for a slave station and a bandwidth required by a slave station as said variable bit rate data; and
      finally allocates a smaller bandwidth of a bandwidth calculated by subtracting an allocated bandwidth from the remaining bandwidth within a frame and a bandwidth required by a slave station as said available bit rate data.

21. The multiple access communication system of claim 17, wherein
   each of said slave stations comprises a transmitter for transmitting data equivalent to a bandwidth as instructed by said instruction means; and
   said instruction transmitter transmits an instruction to a slave station, and transmits another instruction to a next slave station after a time interval corresponding to a bandwidth as instructed by the instruction transmitter to said slave station.

22. The multiple access communication system of claim 17, wherein said multiple access communication is conducted in an asynchronous transmission mode.

23. A multiple access communication system for use with a polling method for transmitting and receiving three types of data, a constant bit rate data of which allocated bandwidth within a frame is fixed, a variable bit rate data of which allocated bandwidth can vary but an average of said allocated bandwidth must be larger than a preset value and an available bit rate data of which allocated bandwidth is freely variable, between a master station and a plurality of slave stations, wherein
   each of said slave stations comprises:
      a data type transmitter for transmitting data information indicating a data type of data to be transmitted among said constant bit rate, said variable bit rate and said available bit rate data, and data amount to be transmitted; and
      a data transmitter for transmitting data as instructed by said master station for each data type; and
   said master station comprises:
      a periodic frame setter for setting a periodic frame;
      a bandwidth allocator firstly allocating a constant bandwidth selected from remaining bandwidth within said frame as said constant bit rate data, secondly allocating a smallest bandwidth selected from among a bandwidth calculated by subtracting an allocated bandwidth from a remaining bandwidth within a frame, a bandwidth that is needed to make an averaged bandwidth be said preset value of bandwidth, a maximum bandwidth that is possible to be set for a slave station and a bandwidth required by a slave station as said variable bit rate data, and finally allocating a smaller bandwidth of a bandwidth calculated by subtracting an allocated bandwidth from a remaining bandwidth within a frame and a bandwidth required by a slave station as said available bit rate data; and
      an instruction transmitter for transmitting an instruction to transmit data equivalent to a bandwidth allocated by said bandwidth allocator to a slave station for each frame.

24. The multiple access communication system of claim 23, wherein said instruction transmitter transmits an instruction to a slave station, and transmits another instruction to a next slave station after a time interval corresponding to a bandwidth allocated to said slave station.

25. The multiple access communication system of claim 23, wherein said multiple access communication is conducted in an asynchronous transmission mode.

* * * * *